(12) United States Patent
Morisawa et al.

(10) Patent No.: US 6,306,057 B1
(45) Date of Patent: Oct. 23, 2001

(54) HYBRID DRIVE SYSTEM

(75) Inventors: Kunio Morisawa, Toyota; Hiroyuki Shioiri; Yuji Iwase, both of Susono; Hiroshi Itoh, Toyota; Nobuyuki Nagashima; Mitsuhiro Umeyama, both of Susono; Yutaka Taga, Aichi-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/555,607

(22) PCT Filed: Dec. 1, 1998

(86) PCT No.: PCT/JP98/05401

§ 371 Date: May 31, 2000

§ 102(e) Date: May 31, 2000

(87) PCT Pub. No.: WO99/29533

PCT Pub. Date: Jun. 17, 1999

(30) Foreign Application Priority Data

Dec. 5, 1997 (JP) .................................................... 9-352370
Sep. 7, 1998 (JP) .................................................. 10-253121

(51) Int. Cl.$^7$ ..................................................... B60L 11/14
(52) U.S. Cl. .............................................................. 475/5
(58) Field of Search ................................................... 475/5

(56) References Cited

U.S. PATENT DOCUMENTS 5,285,111 * 2/1994 Sherman ................................. 290/4 C
5,669,842 * 9/1997 Schmidt ..................................... 475/5

FOREIGN PATENT DOCUMENTS

| A-3-273933 | 12/1991 | (JP) . |
| A-6-185605 | 7/1994 | (JP) . |
| A-6-213316 | 8/1994 | (JP) . |
| A-7-12185 | 1/1995 | (JP) . |
| A-8-318746 | 12/1996 | (JP) . |
| A-9-37411 | 2/1997 | (JP) . |
| A-9-71138 | 3/1997 | (JP) . |
| A-9-109705 | 4/1997 | (JP) . |
| A-9-191504 | 7/1997 | (JP) . |
| A-9-233606 | 9/1997 | (JP) . |
| A-9-308011 | 11/1997 | (JP) . |

* cited by examiner

*Primary Examiner*—Dirk Wright
(74) *Attorney, Agent, or Firm*—Oliff & Berridge PLC

(57) ABSTRACT

A hybrid drive system comprising: a torque amplify mechanism coupled to an output member of an internal combustion engine and an output member of an electric motor, as energized by an electric power to output a torque, for amplifying and outputting the torque, as outputted from the internal combustion engine, by controlling the torque of the electric motor; and a continuously variable transmission arranged between torque amplify mechanism and the output shaft for increasing/decreasing and outputting the torque inputted from the torque amplify mechanism. Further comprised is a forward/backward switching mechanism between the torque amplify mechanism and the output shaft for setting a forward state, in which the inputted motive power is unreversed and outputted, and a backward state in which the inputted motive power is reversed and outputted. As a result, the reverse run can be made only with the motive power outputted from the internal combustion engine.

19 Claims, 26 Drawing Sheets

FIG.2

| DRIVE MODE | 17 | 18 | ONE-WAY CLUTCH | FORWARD 35 | FORWARD 36 | REVERSE 35 | REVERSE 36 | MOTOR/GENERATOR | ENGINE |
|---|---|---|---|---|---|---|---|---|---|
| TORQUE AMPLIFY MODE | ○ | × | FREE | ○ | × | × | ○ | GENERATOR OR MOTOR | ○ |
| DIRECT MOTOR MODE | × | ○ | FREE | ○ | × | × | ○ | MOTOR | × |
| DIRECT ENGINE MODE | ○ | ○ | FREE | ○ | × | × | ○ | GENERATOR | ○ |
| MOTOR ASSIST MODE | ○ | ○ | FREE | ○ | × | × | ○ | MOTOR | ○ |
| REGENERATIVE BRAKE (POWER OFF) | × | × | ○ | ○ | × | × | ○ | GENERATOR | × |
| ENGINE START (AT VEHICLE STOP) | ○ | ○ | FREE | ○ | × | × | ○ | MOTOR (BACKWARD) | |
| ENGINE START (AT VEHICLE RUN) | ○ | ○ | FREE | ○ | × | × | ○ | MOTOR (FORWARD) | |

|  |  | C1 | C2 | B1 |
|---|---|---|---|---|
|  | ENG. START | X | O | O |
| FWD. | ETC | X | O | X |
|  | MOTOR | O | X | X |
|  | ENG. (+ MOTOR) | O | O | X |
| REV. | ENG. | O | X | O |
|  | MOTOR | O | X | X |
|  | ENG. (+MOTOR) | O | X | O |

|  |  | C1 | C2 | B1 |
|---|---|---|---|---|
| ENG. START | | × | ○ | ○ |
| FWD. | ETC | × | ○ | × |
| | MOTOR | ○ | ○ | × |
| | ENG. (+MOTOR) | ○ | ○ | × |
| REV. | ENG. | ○ | × | ○ |
| | MOTOR | ○ | ○ | × |
| | ENG.(+ MOTOR) | ○ | × | ○ |

|  | C1 | C2 | C3 | C4 | F1 |
|---|---|---|---|---|---|
| ENG. START | X | O | X | O | O |
| FWD. ETC | X | O | X | O | X |
| MOTOR | X | O | O | X | X |
| ENG. (+MOTOR) | O | O | O | X | X |
| REV. ENG. | O | X | O | X | X |
| MOTOR | X | O | O | X | X |

|  |  | C1 | C2 | B1 |
|---|---|---|---|---|
|  | ENG. START | X | O | O |
| FWD. | ETC | X | O | X |
|  | MOTOR | O | X | X |
|  | ENG. (+MOTOR) | O | O | X |
| REV. | ENG. | O | X | O |
|  | MOTOR | O | X | X |
|  | ENG. (+ MOTOR) | O | X | O |

|  |  | C1 | C2 | B1 | B2 | F1 |
|---|---|---|---|---|---|---|
| ENG. START |  | O | × | × | O | O |
| FWD. | ETC | O | × | × | × | × |
|  | MOTOR | × | × | O | O | × |
|  | ENG. (+ MOTOR) | O | O | × | × | × |
| REV. | ENG. | × | O | O | × | O |
|  | MOTOR | × | × | O | × | O |
|  | ENG. (+ MOTOR) | × | O | O | × | O |

|  | | C1 | C2 | B1 | B2 |
|---|---|---|---|---|---|
| ENG. START | | O | X | O | X |
| FWD. | ETC | O | X | X | X |
| | MOTOR | X | O | X | X |
| | ENG.(+ MOTOR) | O | O | X | X |
| REV. | ENG. | O | X | X | O |
| | MOTOR | X | X | X | O |
| | ENG. (+MOTOR) | O | X | X | O |

HYBRID DRIVE SYSTEM

TECHNICAL FIELD

The present invention relates to a hybrid drive system equipped as its prime mover with an internal combustion engine such as a gasoline engine or a Diesel engine and an electric motor such as a motor or a motor/generator to be activated by an electric power for generating a motive power.

BACKGROUND ART

As well known in the art, the internal combustion engine inevitably emits exhaust gases. The components and quantities of the exhaust gases depend upon the running state of the internal combustion engine. In the ordinary tendencies, at a heavy loading time when a throttle opening is widened, the cleanness of the exhaust gases is liable to become lower along with the fuel economy. In recent years, on the other hand, the demand for the cleanness of the exhaust gases of the vehicle having the internal combustion engine mounted thereon has grown higher and higher, and a hybrid drive system has been developed to satisfy the demand.

This hybrid drive system is a drive system equipped with the internal combustion engine and an electric motor as its prime movers and is basically constructed such that the internal combustion engine is activated in the most efficient state whereas the electric motor is run as an assistant or a prime mover in other running states. Thus, the hybrid drive system is equipped with an electric motor capable of controlling its torque with an electric current so that it does not employ any transmission as in the prior art adopting the internal combustion engine exclusively as the prime mover. In the so-called "parallel hybrid type", however, the transmission has been mounted on the hybrid drive system in which the internal combustion engine is used not only for the power generating prime mover but also for a running prime mover. In addition, there has been developed a system in which the torque of the internal combustion engine and the torque of the electric motor are inputted to a single transmission mechanism such as a planetary gear mechanism so that the output torque of the internal combustion engine may be amplified and outputted.

An example of this system has been disclosed in Japanese Patent Laid-Open No. 37411/1997. As shown in FIG. 11 of the Laid-Open, the system is equipped with a double pinion type planetary gear mechanism which has: a ring gear coupled to an output shaft; a sun gear coupled to a motor/generator; an input clutch for coupling a carrier and an engine; a brake for fixing the carrier selectively; and an integral clutch for coupling the carrier and the sun gear to integrate the planetary gear mechanism as a whole. Moreover, the output shaft can be coupled to a continuously variable transmission.

In the hybrid drive system disclosed in FIG. 11 of the Laid-Open, therefore, when a motive power is inputted from the motor/generator to the sun gear with a motive power being inputted to the carrier from the engine, a higher torque than the engine torque is outputted to the ring gear acting as an output member. When the motor/generator is reversed to absorb the motive power, on the other hand, it is possible to generate an electric power. Moreover, the driving force can be continuously changed according to the gear ratio at the continuously variable transmission. By making use of the torque amplifying function in the planetary gear mechanism and the continuous gear ratio changing function of the continuously variable transmission, the internal combustion engine can be run to optimize the fuel economy.

If the electric motor is provided as the prime mover, as described above, the output torque of the electric motor can be controlled with the electric current so that the transmission can be basically eliminated. In the aforementioned hybrid drive system of the prior art, the planetary gear mechanism and the continuously variable transmission have been utilized as control means for the run of the internal combustion engine to optimize the fuel economy. In the aforementioned construction of the planetary gear mechanism, therefore, during the run with the output of the internal combustion engine, the ring gear acting as an output element cannot be rotated backward of the carrier acting as an input element. In the case of a reverse run by the aforementioned hybrid system of the prior art, therefore, the internal combustion engine is held in the idling state, and the carrier is fixed by the brake. In this state, the ring gear or the output element is rotated backward of the internal combustion engine by causing the motor/generator to function as a motor.

In short, the hybrid drive system of the prior art is constructed to effect the reverse run with the electric motor. When the state of charge (SOC) of the (storage) battery is short, therefore, there is no possibility that a sufficient torque demanded for the reverse run can be outputted. In order to eliminate this disadvantage, the internal combustion engine may be started to charge up the battery. Then, the reverse run has to await completion of the charge. Especially the parallel hybrid system in which the electric motor acts as a generator cannot perform the run and the generation simultaneously with the electric motor. Thus, there arises a drawback that the reverse run becomes difficult as soon as the charge in the battery drops.

The invention has an object to provide a hybrid drive system capable of retaining a torque for a reverse run even when the charge of the battery is short.

Another object of the invention is to provide a hybrid drive system capable of running backward with an internal combustion engine and having a small size.

DISCLOSURE OF THE INVENTION

According to a first feature of the invention, the hybrid system is equipped with a forward/backward switching mechanism for reversing the motive power to be transmitted to the output shaft. The motive power to be inputted to the forward/backward switching mechanism is outputted from an electric motor or an internal combustion engine. The motive power to be transmitted to the output shaft can be reversed, even directed for the forward run, by the forward/backward switching mechanism so that the reverse run can be effected even while the internal combustion engine is exclusively activated. In short, the vehicle can run backward without any assist of the electric motor.

The hybrid system according to the invention comprises a continuously variable transmission. The continuously variable transmission to be employed has a construction in which a drive side member and a driven side member are arrayed in parallel, so that the hybrid drive system can shorten its whole length. By arranging the forward/backward switching mechanism in alignment with the driven side member, the space can be effectively used to reduce the size of the system.

Moreover, a first engagement device for setting a forward state and a second engagement device of setting a backward state are arranged on the two sides across the driven side member so that the system can be made smaller.

According to another feature of the invention, the hybrid drive system synthesizes the motive power outputted from the electric motor and the motive power outputted from the internal combustion engine with a planetary gear mechanism and outputs the synthesized motive power to the output member. At the time of outputting the motive power from the planetary gear mechanism to the output member, this output member can be selectively coupled to any two rotary elements of the planetary gear mechanism, and any rotary element of the planetary gear mechanism can be fixed by brake means, so that the motive power inputted to the planetary gear mechanism can be reversed and outputted to the output member. This makes it possible for the vehicle to run with only the motive power of the internal combustion engine. Moreover, the mechanism for synthesizing the motive power of the electric motor and the motive power of the internal combustion engine also acts as a mechanism for the reverse run so that the system can be small-sized with the reduced number of components.

In the invention, moreover, the mechanism for synthesizing the torque and for reversing the direction of the motive force for the reverse run can be exemplified by a double pinion type planetary gear mechanism, a single pinion type planetary gear mechanism or a Ravignaux type planetary gear mechanism and can be constructed by combining a plurality of planetary gear mechanisms.

BRIEF DESCRIPTION OF THE DRAWINGS

FIG. 2 is a table enumerating the applied/released states of a frictional engagement device for setting individual drive modes in a hybrid drive system having the construction shown in FIG. 1.

BEST MODE FOR CARRYING OUT THE INVENTION

Figure 1:
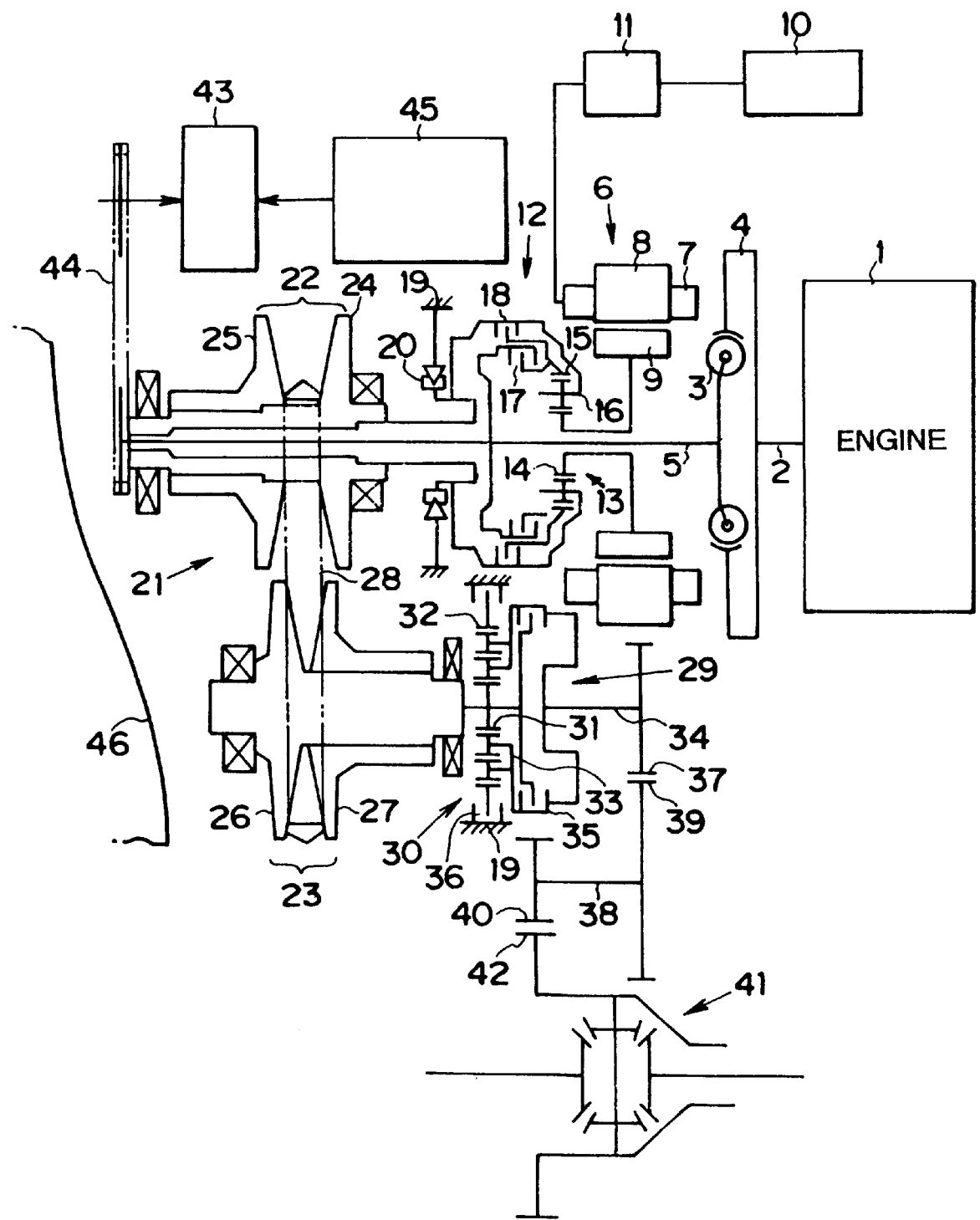
FIG. 1 is a skeleton diagram for explaining one example of the invention.

The invention will be described more specifically in the following. FIG. 1 is a schematic diagram showing one example of a hybrid drive system according to the invention. An internal combustion engine 1 such as a gasoline engine or a Diesel engine is connected at its output member, i.e., a crankshaft 2 to a flywheel 4 having a damper mechanism 3 mounted therein. In alignment with these crankshaft 2 and flywheel 4, there is arranged an input shaft 5, which is connected through the damper mechanism 3 to the flywheel 4.

Around the input shaft 5 and adjacent to the flywheel 4, there is arranged in alignment with the input shaft 5 a motor-and-generator (as will be called the "motor/generator) 6. This motor/generator 6 is constructed, like one used in the hybrid drive system of the prior art, such that a rotor 9 is arranged rotatably in a stator 8 having a coil 7. When this coil 7 is energized, the rotor 9 is rotated to output a torque. In short, the rotor 9 acts as an output member. When the rotor 9 is rotated by an external force, on the contrary, the coil 7 generates an electromotive force. This coil 7 is electrically connected with a battery 10 through a control circuit 11.

On the side opposed to the flywheel 4 across the motor/generator 6, there is arranged in alignment with the input shaft 5 a torque amplify mechanism 12. In the example shown in FIG. 1, this torque amplify mechanism 12 is constructed mainly of a set of single pinion type planetary gear mechanism 13. Specifically, a sun gear 14 and a ring gear 15 which is an internal gear are concentrically arranged, and a pinion gear meshing with those sun gear 14 and ring gear 15 is retained rotatably and revolvably by a carrier 16.

There is provided an input clutch 17 for coupling the input shaft 5 selectively to the ring gear 15. Hence, this ring gear 15 acts as a first input element. This input clutch 17 is the so-called "frictional engagement device" which is constructed of a multi-disc clutch to be hydraulically applied/released, and is arranged adjacent to the planetary gear mechanism 13 and in alignment with the input shaft 5. On the other hand, the sun gear 14 is connected to the rotor 9 so that it acts as a second input element.

Around the input clutch 17, there is arranged in alignment with the input shaft 5 a direct clutch 18 for integrating the planetary gear mechanism 13 as a whole. This direct clutch 18 is the so-called "frictional engagement device" which is constructed of a multi-disc clutch to be hydraulically applied/released. This direct clutch 18 is coupled at its hub to the ring gear 15 and at its drum to the carrier 16. When the direct clutch 18 is applied, therefore, the two elements of the planetary gear mechanism 13, i.e., the ring gear 15 and the carrier 16 are connected to rotate together so that the planetary gear mechanism 13 is integrated as a whole.

Between the carrier 16 acting as an output element and a predetermined stationary portion such as a housing 19, moreover, there is arranged a one-way clutch 20. This one-way clutch 20 is so constructed that it is applied when the carrier 16 is to rotate in the opposite direction to the crankshaft 2 in the internal combustion engine 1. Hence, this one-way clutch 20 can function as the so-called "hill hold" means for preventing the vehicle from being reversed at a starting time.

Subsequent to the torque amplify mechanism 12, there is provided a continuously variable transmission 21. The example shown in FIG. 1 is constructed to match an FF (Front engine—Front drive) car or an RR (Rear engine—Rear drive) car so that the continuously variable transmission 21 adopted is of the belt type. Specifically, a drive pulley 22 capable of changing its groove width is arranged in alignment with the input shaft 5 and is integrally connected to the carrier 16. Moreover, a driven pulley 23 capable of changing its groove width is arranged to have its center axis of rotation in parallel with the input shaft 5.

This drive pulley 22 is composed of a stationary sheave 24 arranged on a common axis and a movable sheave 25 made axially movable to and from the stationary sheave 24. The groove width between the stationary sheave 24 and the movable sheave 25 is changed by moving the movable sheave 25, as located on the lefthand side of FIG. 1, in the axial direction by an actuator such as a not-shown hydraulic cylinder.

On the other hand, the driven pulley 23 is also composed of a stationary sheave 26 and a movable sheave 27. In order to make the groove in the drive pulley 22 and the groove in the driven pulley 23 concentric at all times, the stationary sheave 26 in the driven pulley 23 is arranged radially outside of the movable sheave 25 in the drive pulley 22, and the movable sheave 27 in the driven pulley 23 is arranged radially outside of the stationary sheave 24 in the drive pulley 22. In this driven pulley 23, too, the groove width is changed by moving the movable sheave 27 back and forth in the axial direction by an actuator such as a not-shown hydraulic cylinder.

On these pulleys 22 and 23, moreover, there is made to run a belt 28. This belt 28 is prepared by jointing a number of metal pieces and is clamped between the individual sheaves 24, 25, 26 and 27 to transmit the torque such that its winding (or engaging) radius is changed according to the groove width. By moving the individual movable sheaves 25 and 27 back and forth to change the groove width oppositely on the drive side and on the driven side, therefore, the winding (or engaging) diameter of the belt 28 is continuously changed to change the ratio of the winding radii on the drive and driven sides, i.e., the gear ratio continuously. This drive pulley 22 corresponds to the drive side member of the invention, and the driven pulley 23 corresponds to the driven side member of the invention.

In the example shown in FIG. 1, the torque amplify mechanism 12, the motor/generator 6 and the internal combustion engine 1 are arranged in the recited order on the common axis on the righthand side of FIG. 1. On the righthand side of FIG. 1, on the other hand, a forward/backward switching mechanism 29 is arranged in alignment with the drive pulley 23. This forward/backward switching mechanism 29 is constructed mainly of a double pinion type planetary gear mechanism 30 in the example shown in FIG. 1. This planetary gear mechanism 30 is constructed such that a sun gear 31 and a ring gear 32 which is an internal gear are arranged on a concentric circle, such that a first pinion gear meshing with the sun gear 31 and a second pinion gear meshing with the first pinion gear and the ring gear 32 are arranged between the sun gear 31 and the ring gear 32, and such that these pinion gears are retained by a carrier 33.

Moreover, the sun gear 31 is connected to the driven gear 23, and the carrier 33 is coupled to an output shaft 34. A forward clutch 35 acting as an engagement device for integrating the entirety of the planetary gear mechanism 30 into the forward state is arranged between the sun gear 31 and the ring gear 32. On the other hand, a reverse brake 36 acting as an engagement device for establishing a reverse state, in which the carrier 33 is rotated in the opposite direction to the sun gear 31, is interposed between the ring gear 32 and a predetermined stationary portion such as the housing 19. More specifically, the forward clutch 35 is arranged on the side opposed to the driven pulley 23 across the planetary gear mechanism 30, and the reverse brake 36 is arranged around the ring gear 32.

The forward/backward switching mechanism 29 is arranged radially outside of the torque amplify mechanism 12. Since this portion is such a space in the continuously variable transmission 21 as is formed by providing the driven pulley 23, the forward/backward switching mechanism 29 is arranged by making effective use of the space.

The output shaft 34, as connected to the carrier 33, is arranged in alignment with the driven pulley 23 and the forward/backward switching mechanism 29. An output gear 37 is integrated with the output shaft 34. In parallel with the output shaft 34, on the other hand, there is arranged a counter shaft 38 which is integrated with a driven gear 39 meshing with the output gear 37 and a drive gear 40 having a smaller diameter than that of the driven gear 39. This drive gear 40 meshes with a ring gear 42 in a differential gear unit 41. The drive gear 40 is preferably arranged around the torque amplify mechanism 12 and the forward clutch 35.

Here, reference numeral 43 in FIG. 1 designates a hydraulic pump which is so coupled to the input shaft 5 by a belt 44 as to transmit the torque. Moreover, a motor 45 is so connected to the hydraulic pump 43 that it can drive the hydraulic pump 43 by itself. Moreover, numeral 46 in FIG. 1 designates a side member constructing the vehicle body. Thanks to the aforementioned arrangement of the forward/backward switching mechanism 29, it is possible to avoid the interference between the forward/backward switching mechanism 29 and the side member 46.

The hybrid drive system thus constructed can be run in a plurality of modes, as enumerated in FIG. 2, because the output of the internal combustion engine 1 and the output of the motor/generator 6 are synthesized by the torque amplify mechanism 12 and outputted. The hybrid drive system can also make the forward run and the reverse run in each of the modes. Here in FIG. 2, symbols ◯ indicate the applied state or the drive state, and symbols X indicate the released state or the non-drive state. Here will be described the individual drive modes.

In a drive mode or a torque amplify mode, the output torque of the internal combustion engine 1 is amplified and outputted by controlling the torque of the motor/generator 6. In this torque amplfy mode, therefore, the internal combustion engine 1 is activated, and the input clutch 17 is applied to transmit the output torque of the internal combustion engine 1 to the torque amplify mechanism 12. On the other hand, there is released the direct clutch 18 for integrating the individual rotary elements of the planetary gear mechanism 13 constructing the torque amplify mechanism 12. Here, the oil pressure for applying the input clutch 17 is generated before the state of the internal combustion engine 1 by driving the hydraulic pump 43 with the motor 45 and during the run by transmitting the torque from the input shaft 5 through the belt 44 to the hydraulic pump 43 to drive the pump 43.

Figure 3:
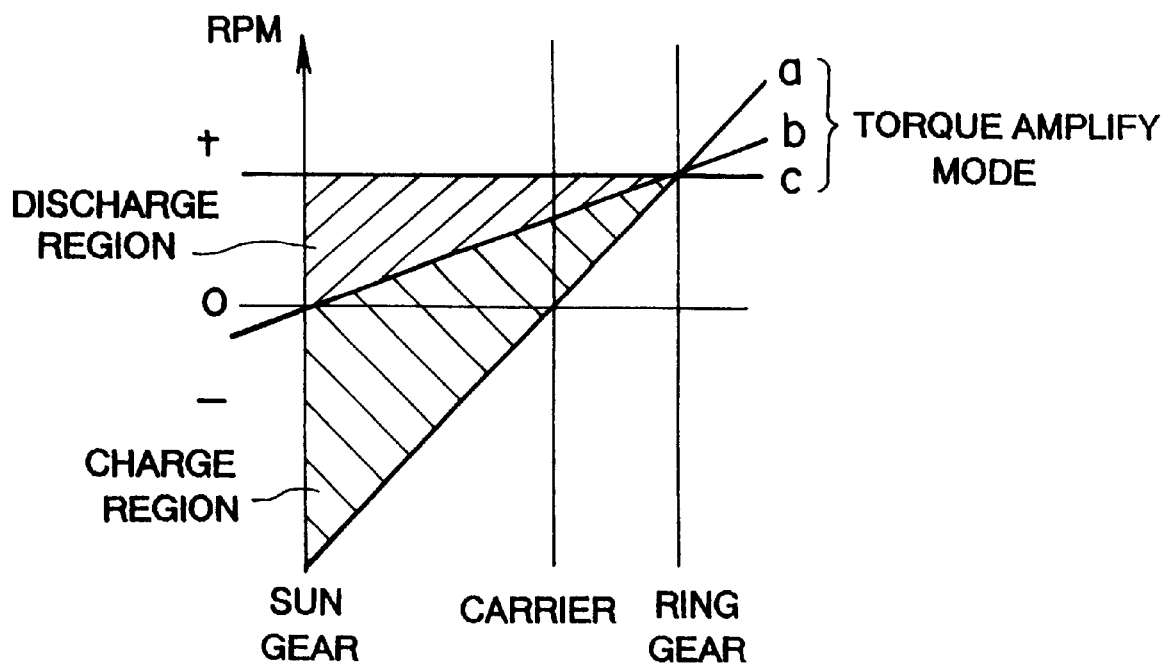
FIG. 3 is a nomographic chart on a planetary gear mechanism of a torque amplify mechanism shown in FIG. 1.

FIG. 3 is a nomographic chart of the planetary gear mechanism 13. As seen from FIG. 3, while the revolution speed of the sun gear 14 (i.e., the revolution speed of the motor/generator 6) acting as the second input element is smaller than the revolution speed of the ring gear 15 (i.e., the output revolution speed of the internal combustion engine 1) acting as the first input element, the revolution speed of the carrier 16 acting as the output element is smaller than the output revolution speed of the internal combustion engine 1. As a result, the torque, as inputted from the sun gear 14, of the motor/generator 6 is added to the output torque, as inputted from the ring gear 15, of the internal combustion engine 1 so that the synthesized torque is outputted from the carrier 16. In other words, the torque outputted from the carrier 16 exceeds the torque inputted from the internal combustion engine 1 so that the planetary gear mechanism 13 performs the amplifying action of the torque.

Here in this case, while the rotor 9 is rotated backward together with the sun gear 14, the motor/generator 6 functions as a generator. In short, the motor/generator 6 generates the electric power by utilizing a part of the output of the internal combustion engine 1. This charge region is defined by lines "a" and "b" in FIG. 3. As the revolution speed (or the output revolution speed) of the carrier 16 increases to start the forward rotation of the sun gear 13, on the other hand, the motor/generator 6 is fed with an electric current to function as a motor so that the battery 10 is discharged. This discharge region is defined by lines "b" and "c" in FIG. 3.

In the torque amplify mode, on the other hand, the carrier 16 which is the output element rotates forward so that the one-way clutch 20 arranged between the carrier 16 and the predetermined stationary portion such as the housing 19 comes into the released (or free) state.

Since the carrier 16 is connected to the drive pulley 22 in the continuously variable transmission 21 by connection means such as a connecting drum, the output torque in the torque amplify mechanism 12 is transmitted to the drive pulley 22. If, in this continuously variable transmission 21, the groove width of the drive pulley 22 is enlarged whereas the groove width of the driven pulley 23 is accordingly reduced, the winding radius of the belt 28 on the drive pulley 22 grows smaller whereas the winding radius of the belt 28 on the driven pulley 23 grows larger, so that the gear ratio to be determined by those winding radii is lowered. If the groove width of the drive pulley 22 is reduced whereas the groove width of the driven pulley 23 is enlarged, on the contrary, the gear ratio is raised. Here, these change/setting of the gear ratio is performed by moving the individual movable sheaves 25 and 27 hydraulically in the axial directions.

Figure 4:
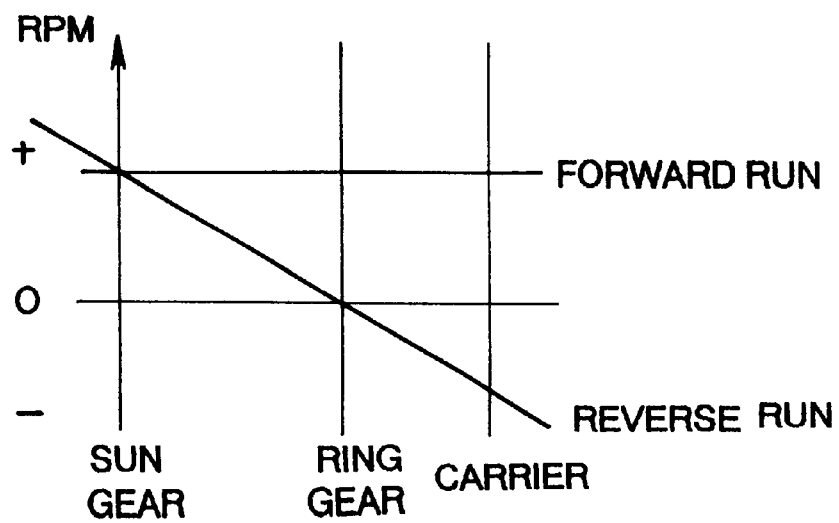
FIG. 4 is a nomographic chart on a planetary gear mechanism of a nomographic chart on a planetary gear mechanism of a forward/reverse switching mechanism shown in FIG. 1.

The torque thus accelerated or decelerated is transmitted from the driven pulley 23 to the forward/backward switching mechanism 29. A nomographic chart of the planetary gear mechanism 30 constructing that forward/backward switching mechanism 29 is illustrated in FIG. 4. In this planetary gear mechanism 30, as has been described hereinbefore, the sun gear 31 acts as the input element, and the carrier 33 acts as the output element so that the carrier 33 rotates in an opposite direction to the sun gear 31 by fixing the ring gear 32. In short, the reverse state is established. Specifically, the reverse brake 36 is applied to fix the ring gear 32, and the forward clutch 35 is released. In this case, the revolution speed of the carrier 33 acting as the output element drops with respect to that of the sun gear 31 acting as the input element so that the output torque is raised with respect to the input torque.

When the entirety is rotated by connecting any two rotary elements, moreover, the input torque is outputted as it is from the carrier 33. In short, the forward state is established. Specifically, the forward clutch 35 is applied to couple the sun gear 31 and the carrier 33, and the reverse brake 36 is released.

The torque thus outputted in the forward or reverse state by the forward/backward switching mechanism 29 is transmitted from the output shaft 34 and the output gear 37 through the driven gear 39, the counter shaft 38, the drive gear 40 and the ring gear 42 to the differential gear unit 41.

Here will be described a direct motor mode. In this drive mode, the motor/generator 6 is caused to function as the motor so that the vehicle runs exclusively with the motive power of the motor/generator 6. This direct motor mode is selected, for example, when the vehicle runs at a relatively low speed in an urban district or a residential district.

In this direct motor mode, therefore, the internal combustion engine 1 is kept stopped, and the input clutch 17 is released to isolate the internal combustion engine 1 and the torque amplify mechanism 12. Since no torque synthesization is effected in the torque amplify mechanism 12, moreover, the direct clutch 18 is applied to integrate the planetary gear mechanism 13 as a whole. As a result, the output torque of the motor/generator 6 is transmitted as it is to the drive pulley 22 of the continuously variable transmission 21. In this case, too, the carrier 16 rotates forward so that the one-way clutch 20 comes into the released state.

Moreover, the acceleration or deceleration is effected by the continuously variable transmission 21 so that the output torque is transmitted to the forward/backward switching mechanism 29. The actions of these continuously variable transmission 21 and the forward/backward switching mechanism 29 have been described hereinbefore. In this direct motor mode, too, it is possible to set the gear ratio arbitrarily and to select the forward or reverse run arbitrarily.

In a direct engine mode, on the contrary, the vehicle runs exclusively with the motive power of the internal combustion engine 1. This direct engine mode is selected, for example, when the vehicle runs at a constant high speed. In this mode, therefore, both the input clutch 17 and the direct clutch 18 are applied to couple the internal combustion engine 1 and the continuously variable transmission 21 directly. The one-way clutch 20 comes into the released state.

As a result, the output torque of the internal combustion engine 1 is transmitted to the continuously variable transmission 21, in which the acceleration/deceleration is effected as described hereinbefore, and the accelerated or decelerated output torque is transmitted to the forward/backward switching mechanism 29, in which it is directed forward or backward and outputted to the output shaft 34. Here, by integrating the entire planetary gear mechanism 13 in the torque amplify mechanism 12, the rotor 9 of the motor/generator 6 rotates together with the sun gear 14 so that the motor/generator 6 generates an electromotive force and functions as the generator.

Here will be described a motor assist mode to be selected at an acceleration time. In this drive mode, a high driving force is generated by adding the output of the motor/generator 6 to the output of the internal combustion engine 1. In this mode, the internal combustion engine 1 is activated, and the motor/generator 6 is fed with the electric power so that it may function as the motor. In order that the outputs of the internal combustion engine 1 and the motor/generator 6 may be utilized as the motive power for the run, moreover, both the individual clutches 17 and 18 in the torque amplify mechanism 12 are applied to integrate the planetary gear mechanism 13 as a whole. Here, the one-way clutch 20 comes into the released state.

As a result, the output of the internal combustion engine 1 and the output of the motor/generator 6 are transmitted as they are to the continuously variable transmission 21. The torques, as inputted to the continuously variable transmission 21, are accelerated or decelerated and transmitted to the forward/backward switching mechanism 29, in which the output is directed forward or backward until it is outputted to the output shaft 34. The actions of these continuously variable transmission 21 and forward/backward switching mechanism 29 have been described hereinbefore.

Here will be described a regenerative brake mode. In this drive mode, the kinetic energy owned by the vehicle is recovered as an electric energy at a deceleration time. Therefore, both the internal combustion engine 1 and the motor/generator 6 are inactivated. In order to prevent the kinetic energy owned by the vehicle from being consumed as the functional heat, moreover, the input clutch 17 is released to uncouple the internal combustion engine 1 from the torque amplify mechanism 12. In order to input the inertial energy at the deceleration time to the motor/generator 6, on the other hand, the direct clutch 18 is applied to rotate the planetary gear mechanism 13 integrally as a whole.

While the vehicle is running forward, on the other hand, the forward clutch 35 is applied, but the reverse brake 36 is released, as described hereinbefore. At a backward run, on the other hand, the forward clutch 35 is released, but the reverse brake 36 is applied. In the so-called "power-off" state in which the motive power is inputted to the torque amplify mechanism 12 from the side of the output shaft 34, the continuously variable transmission 21 rotates as at the forward running time to accelerate or decelerate the torque, as inputted from the side of the output shaft 34, and transmits the accelerated or decelerated torque to the planetary gear mechanism 13 of the torque amplify mechanism 12. The planetary gear mechanism 13 has the applied direct clutch 18 so that its entirety integrally rotates. As a result, the rotor 9 rotates together with the planetary gear mechanism 13 so that the motor/generator 6 generates the electric power. Then, the kinetic energy owned by the vehicle is converted into and recovered as the electric energy so that the vehicle is braked. In this case, too, the carrier 16 in the planetary gear mechanism 13 rotates forward so that the one-way clutch 20 comes into the released state.

Here will be described an engine start mode. In the hybrid drive system thus far described, the internal combustion engine 1 and the motor/generator 6 are so coupled through the torque amplify mechanism 12 as to transmit the torque so that the internal combustion engine 1 can be started by the motor/generator 6. While the vehicle is stopped, more specifically, all the rotary elements such as the continuously variable transmission 21 or the forward/backward switching mechanism 29 are stopped so that the individual elements of the planetary gear mechanism 13 constructing the torque amplify mechanism 12 are stopped. In order to rotate the internal combustion engine 1 forward from this state, the motor/generator 6 coupled to the sun gear 14 is rotated backward.

This will be described with reference to the nomographic chart of FIG. 3. The input clutch 17 is applied to couple the internal combustion engine 1 to the planetary gear mechanism 13, but the direct clutch 18 is released to make the individual members of the planetary gear mechanism 13 rotatable relative to each other. In this state, the straight line joining the sun gear 14, the carrier 16 and the ring gear 15 is rotated counter-clockwise on the carrier 16. When the rotation of the sun gear 14 is lowered, more specifically, the backward rotation of the carrier 14 is blocked by the one-way clutch 20 so that the rotation of the ring gear 15 is raised. In other words, the motor/generator 6 is energized to function as the motor to rotate backward. As a result, the crankshaft 2 of the internal combustion engine 1 is rotated forward together with the ring gear 15 to start the internal combustion engine 1.

When the internal combustion engine 1 is to be started during the run, on the other hand, the motor/generator 6 is energized to function as the motor to rotate forward. In the state where the vehicle is running with the internal combustion engine 1 being stopped, more specifically, the output of the motor/generator 6 is employed as the driving force. In this case, the input clutch 17 and the direct clutch 18 are applied, as has been described in the foregoing direct motor mode. Specifically, the planetary gear mechanism 13 integrally rotates as a whole so that the vehicle runs while rotating the internal combustion engine 1 forcibly by the motor/generator 6. In this state, therefore, the internal combustion engine 1 is started by feeding it with a fuel.

In the hybrid drive system thus far described according to the invention, the torque outputted from the continuously variable transmission 21 is transmitted either unchangedly or reversely to the output shaft 34 by the forward/backward switching mechanism 29. Therefore, the rotating direction of the prime mover may be identical no matter whether the vehicle runs forward or backward. Even when the vehicle has to be driven only by the internal combustion engine 1 which cannot be reversed, that is, when the charge of the battery 10 is so low that the output torque of the motor/generator 6 is short, therefore, the driving torque at the reverse run can be retained necessarily and sufficiently by driving the internal combustion engine 1.

Since the aforementioned hybrid drive system adopted the belt type continuously variable transmission 21, on the other hand, the individual pulleys 22 and 23 have to be diametrically enlarged so as to raise the torque to be transmitted. Since the forward/backward switching mechanism 29 is arranged in alignment with the driven pulley 23, however, the space to be established by providing the driven pulley 23 can be effectively utilized to make the entire system compact.

In short, the forward clutch 35 in the forward/backward switching mechanism 29 is a clutch for coupling the input member and the output member integrally. Therefore, the forward clutch 35 may be constructed to couple the driven pulley 23 and the output shaft 34 selectively, as exemplified in FIG. 5.

Figure 5:
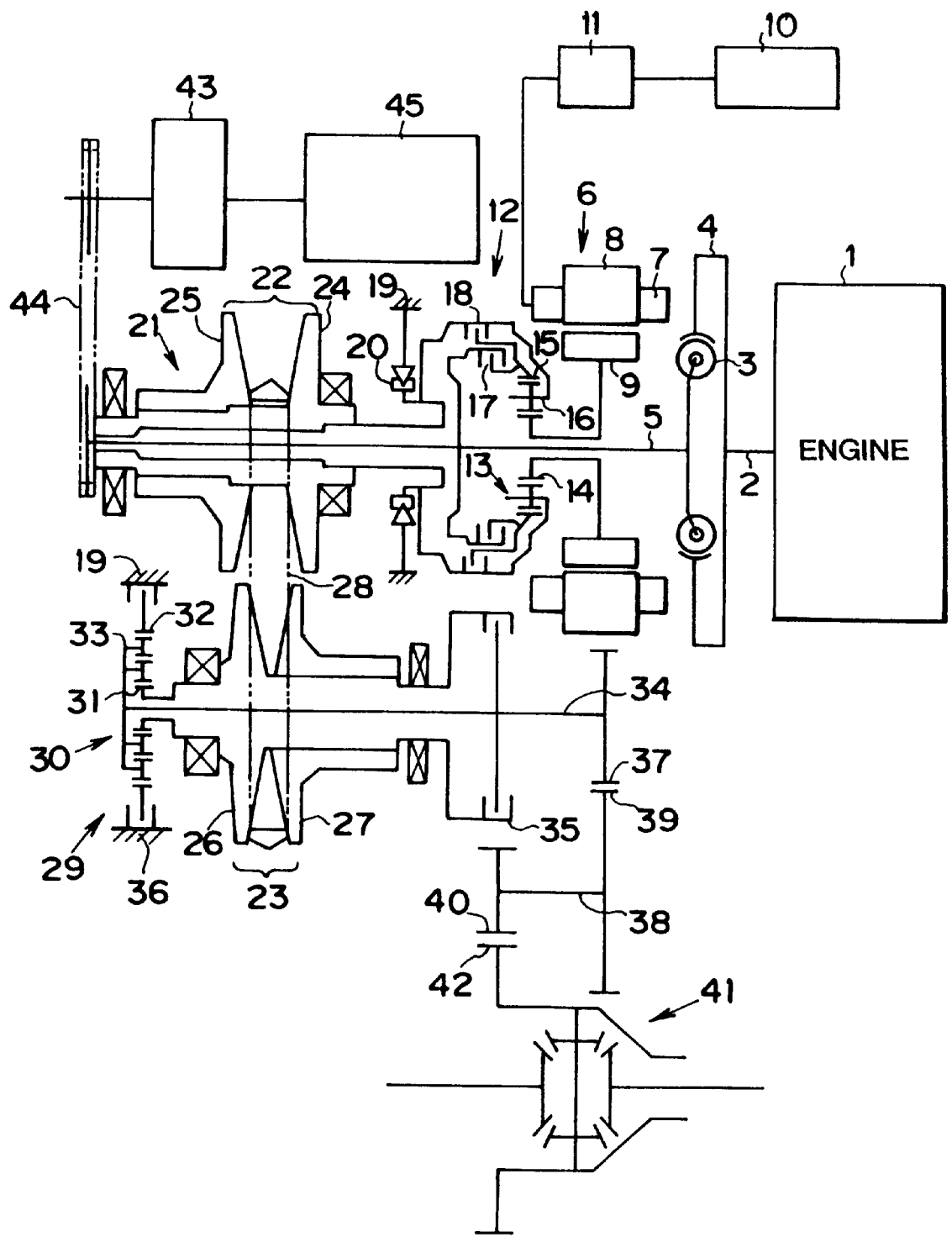
FIG. 5 is a skeleton diagram for describing another example of the invention.

In the example shown in FIG. 5, specifically, the output shaft 34 is set to have a length to pass the driven pulley 23 therethrough in its center axis, and the double pinion type planetary gear mechanism 30 and the forward clutch 35 are arranged on the both sides across the driven pulley 23. Across the driven pulley 23, more specifically, the planetary gear mechanism 30 is arranged on the lefthand side of FIG. 5, and the forward clutch 35 is arranged on the righthand side of FIG. 5.

Moreover, one end portion (as located on the lefthand side of FIG. 5) of the output shaft 34 is connected to the sun gear 31 of the planetary gear mechanism 30, and the reverse brake 36 is arranged around the ring gear 32. In addition, the forward clutch 35 for coupling the driven pulley 23 and the output shaft 34 selectively is arranged in alignment with the output shaft 34 and around the aforementioned torque amplify mechanism 12. The remaining construction is similar to that shown in FIG. 1, and its description will be omitted by giving FIG. 5 the same reference numerals as those of FIG. 1.

The aforementioned continuously variable transmission 21 is constructed by winding the belt 28 on the drive pulley 22 and the driven pulley 23, and its pulleys 22 and 23 are composed of the stationary sheaves 24 and 26 and the movable sheaves 25 and 27 so as to change their groove widths. For this construction, there is required a space for the actuator to move the movable sheaves 25 and 27 and for its stroke.

In the examples shown in FIGS. 1 and 5, the movable sheave 25 of the drive pulley 22 is arranged on the end side (as located at the righthand side of FIGS. 1 and 5) of the input shaft 5 so that a space is left around it. In the example shown in FIG. 1, in order to minimize the space around the movable sheave 25, the not-shown casing is recessed to avoid the interference with the side member 46. In the example shown in FIG. 5, however, the space around the movable sheave 25 is effectively utilized to arrange therein the planetary gear mechanism 30 for the forward/backward switching mechanism 29. With the construction shown in FIG. 5, therefore, the space can be effectively utilized to make the system compact as a whole.

Here, the aforementioned examples shown in FIGS. 1 and 5 adopt the belt type transmission as the continuously variable transmission 21. However, the invention can adopt as the continuously variable transmission another construction such as a toroidal type continuously variable transmission shown in FIG. 6. Here will be described this construction shown in FIG. 6. An input disc 51 and an output disc 52, as having toroidal faces on their confronting sides, are arranged in alignment with the torque amplify mechanism 12. On the side of the torque amplify mechanism 12, there is positioned the input disc 51, to which the carrier 16 acting as the output member in the torque amplify mechanism 12 is coupled.

On the side opposed to the input disc 51 across the output disc 52 confronting the input disc 51, there is arranged the planetary gear mechanism 30 which constructs the forward/backward switching mechanism 29. Moreover, the sun gear 31 and the output disc 52 are coupled to rotate together. Between the confronting toroidal faces of the input disc 51 and the output disc 52, on the other hand, there is arranged a power roller 53. This power roller 53 is so retained as to rotate on its center axis and is constructed such that its center axis is inclined in a plane containing the center axes of the individual discs 51 and 52. As a result, the radius where the power roller 53 contacts with the individual discs 51 and 52 changes with the inclination of the power roller 53 so that the revolution speed of the output disc 52 relative to the input disc 51, i.e., the gear ratio is continuously changed.

Figure 6:
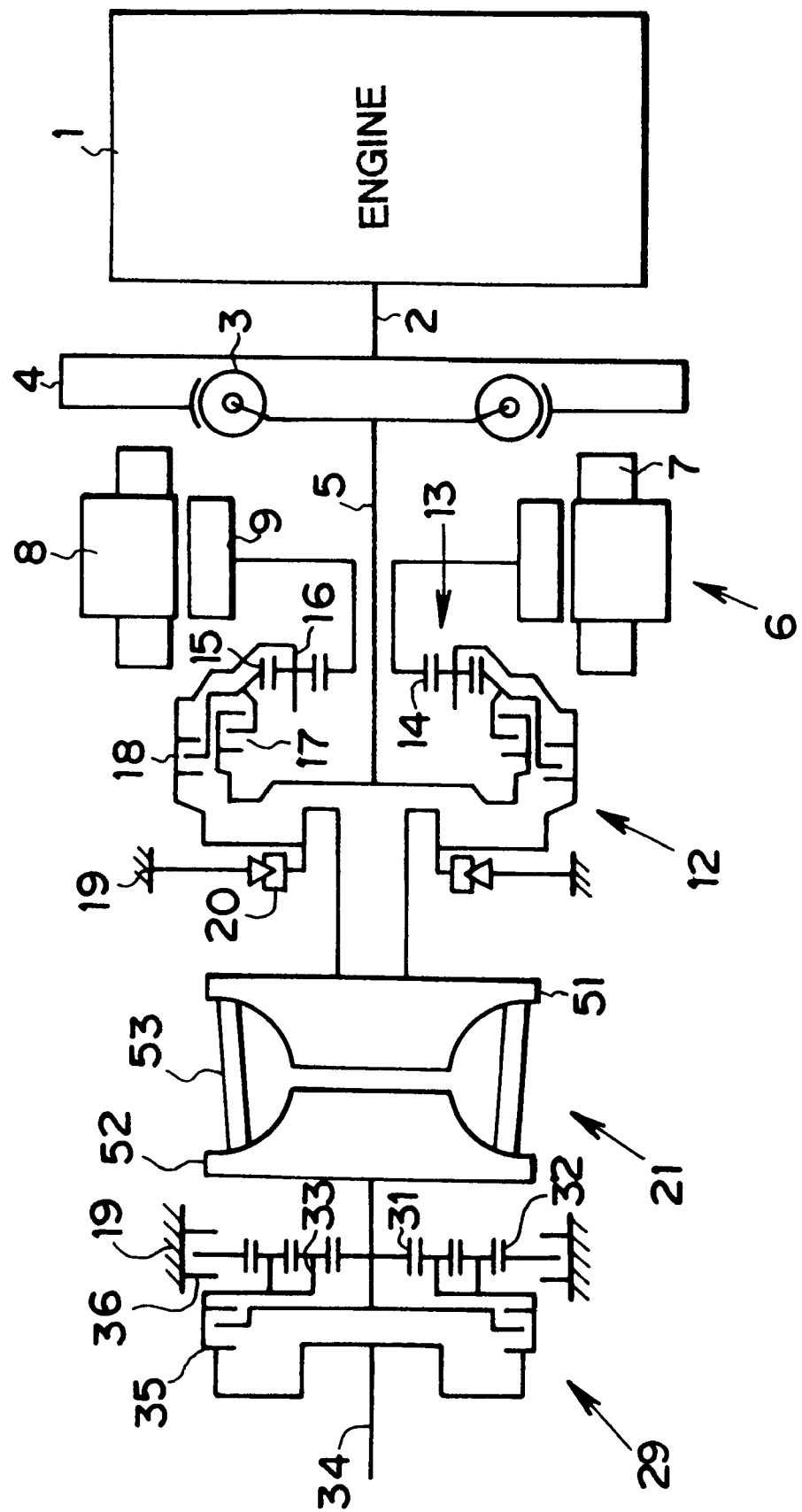
FIG. 6 is a skeleton diagram for describing still another example of the invention.

The construction, as made in FIG. 6, can match an FR (Front engine—Rear drive) car because the individual components from the internal combustion engine 1 to the output shaft 34 are arranged on the common axis. On the other hand, it is similar to the hybrid drive system shown in FIG. 1 or 5 that the reverse run can be made with the output of the internal combustion engine 1 and that the individual drive modes shown in FIG. 2 can be established.

Moreover, the torque amplify mechanism 12 in the invention should not be limited to the construction including the aforementioned single pinion type planetary gear mechanism, input clutch 17 and direct clutch 18 but could be exemplified by a construction using the double pinion type as the planetary gear mechanism or a construction made mainly of the differential gear unit or could be constructed, in short, of a gear device or a roller device which is provided with three rotary elements to have the differential function.

On the other hand, the forward/backward switching mechanism may be so constructed, in short, as to selectively set the forward state, in which the input torque and the output torque are identically directed, and the reverse state in which those torque directions are opposed to each other. Hence, the forward/backward switching mechanism to be adopted can be equipped with an idle gear or a synchronous coupling mechanism (or synchronizer). This forward/backward switching mechanism is required to set the reverse state by reversing the torque which is synthesized of the output torque of the internal combustion engine and the output torque of the electric motor such as the motor/generator. For this requirement, the forward/backward switching mechanism is arranged closer to the output shaft than the torque amplify mechanism. The position of this arrangement may be located not only on the output side of the continuously variable transmission, as described hereinbefore, but also on the input side of the same. After all, the position of this arrangement may be located between the torque amplify mechanism and the output shaft. Here, the output shaft of the invention should not be limited to the aforementioned shaft mounting the output gear but may be any shaft if it establishes the substantial output entirely of the system.

Figures 7, 8:
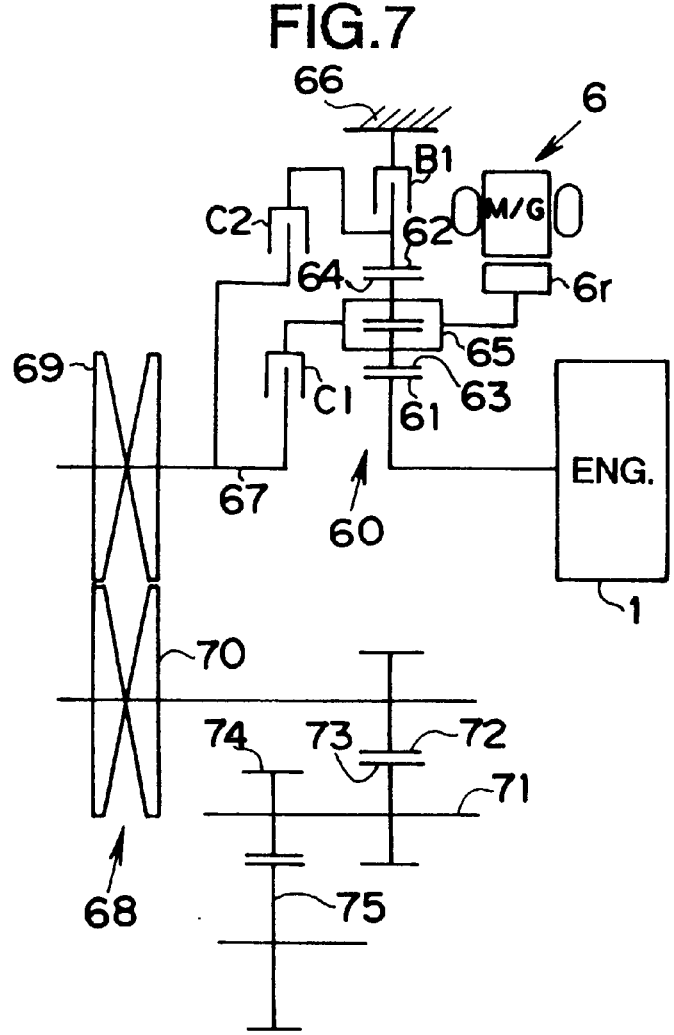
FIG. 7 is a skeleton diagram showing one example of the invention.
FIG. 8 is a table enumerating the applied/released states of a frictional engagement device for setting individual drive modes in a hybrid drive system having the construction shown in FIG. 7.

Here will be described an example which is constructed to set a reverse stage by a mechanism for synthesizing the motive power of an internal combustion engine and the motive power of an electric motor. FIG. 7 is a schematic diagram showing the example, in which the outputs of the internal combustion engine 1 and the electric motor 6 are outputted either separately or synthetically. The internal combustion engine 1 is a power unit such as a gasoline engine or a Diesel engine for outputting the motive power by burning a fuel. In the following description, the internal combustion engine will be shortly referred to as the engine (Eng.) 1.

On the other hand, the electric motor 6 is, in short, a power unit for rotating to output the motive power when fed with an electric current and can be exemplified not only by motors of various types such as a synchronous type but also by an electric motor having a power generating function. In the following description, the electric motor is exemplified by one having the power generating function and will be shortly referred to as the motor/generator (M/G) 6.

As the mechanism for outputting the motive powers of those engine 1 and motor/generator 6 either individually or synthetically, there is provided a mechanism which is constructed mainly of a double pinion type planetary gear mechanism 60. This planetary gear mechanism 60 is made of the well-known construction which includes rotary elements: a sun gear 61 which is an external gear; a ring gear 62 which is an internal gear arranged concentrically of the sun gear 61; and a carrier 65 retaining a first pinion gear 63 meshing with the sun gear 61 and a second pinion gear 64 meshing with the first pinion gear 63 and the ring gear 62 rotatably and revolvably, so that the differential actions may be made among the three rotary elements.

To the sun gear 61 of these rotary elements, there is connected the output shaft (e.g., the crankshaft) of the engine 1. When this engine 1 is exemplified by a reciprocating engine, there are caused torque fluctuations or vibrations due to the intermittent combustion of the fuel. In order to absorb or damp the vibrations, there may be interposed a (not-shown) damper mechanism between the engine 1 and the sun gear 61. To the carrier 65, on the other hand, there is connected a rotor 6r of the motor/generator 6.

Between the ring gear 62 and a casing 66, there is interposed a brake B1. This brake B1 fixes the ring gear 62 selectively and may be exemplified by a functional engagement type device such as a multi-disc brake or a band brake. The brake B1 may also be exemplified by not only the hydraulically actuated type but also an electrically actuated type. An output shaft 67 acting as the output member is arranged in alignment with the engine 1. As means for transmitting the motive power selectively to the output shaft 67, there are provided two clutches: a first clutch C1 for coupling the carrier 65 and the output shaft 67 selectively; and a second clutch C2 for coupling the ring gear 62 and the output shaft 67 selectively. These clutches C1 and C2 are most generally exemplified by the multi-disc type to be hydraulically applied/released but can otherwise be exemplified by various types such as a dog clutch and equipped with electric means for applying/releasing it.

The output shaft 67 is coupled to a transmission 68. This transmission 68 changes the gear ratio to raise or lower the driving torque and can be exemplified by various transmissions such as a discontinuous type transmission constructed mainly of a planetary gear mechanism, a discontinuous type transmission for changing the coupling relations of rotary elements by a synchronous switching mechanism (or synchronizer), a belt type continuously variable transmission or a toroidal type continuously variable transmission. FIG. 7 shows the belt type continuously variable transmission 68 schematically.

This continuously variable transmission 68 is made of the well-known construction in which a drive pulley 69 and a driven pulley 70 capable of changing their groove widths are arranged in parallel so that the winding radius of the (not-shown) belt on the pulleys 69 and 70 may be changed to change the gear ratio continuously by changing the groove widths of those pulleys 69 and 70.

In parallel with the driven pulley 70, there is arranged a counter shaft 71. These driven pulley 70 and the counter shaft 71 are coupled by a pair of counter gears 72 and 73. Moreover, another gear 74, as mounted on the counter shaft 71, meshes with an output gear 75, which is exemplified by the ring gear of a differential unit.

Here will be described the actions of the aforementioned hybrid drive system. This system according to the invention can establish a variety of running (drive) modes in accordance with the applied states of the brake B1 and the individual clutches C1 and C2, as tabulated in FIG. 8. In FIG. 8 and similar other Figures, symbols X indicate the released (inactive) state, and symbols ○ indicate the applied (active) state. Here will be described the individual drive modes.

First of all, an engine start mode will be described. In this mode, the engine 1 is started while the vehicle is stopped, and the brake B1 is applied. Specifically, the ring gear 62 of the planetary gear mechanism 60 is fixed with respect to the casing 66. In addition, the second clutch C2 may be applied to fix the output shaft 67. When, in this state, the motor/generator 6 is driven in the opposite direction to the rotating direction of the engine 1 to rotate the carrier 65 backward, the sun gear 61 rotates forward because the ring gear 62 is fixed. In short, the engine 1, as coupled to the sun gear 61, is rotated forward so that the engine 1 is started by starting the feed of the fuel simultaneously and by igniting it if it is the gasoline engine.

Figure 9:
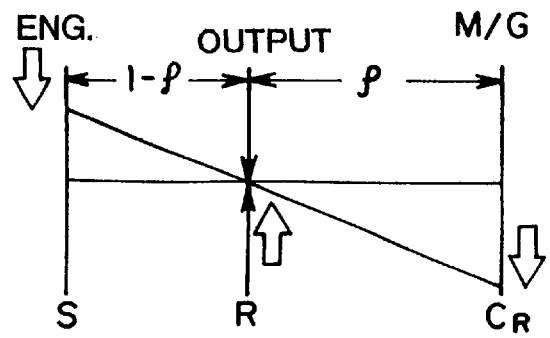
FIG. 9 is a nomographic chart for describing the rotational states of individual rotary elements in an engine start mode by the hybrid drive system having the construction shown in FIG. 7.

This state is illustrated as a nomographic chart in FIG. 9. In FIG. 9 and other similar Figures: a letter "S" designates the sun gear 61; a letter "R" the ring gear 62; and letters "CR" the carrier 65. On the other hand, arrows indicate the directions of torques. Moreover, a letter ρ indicates the ratio (or gear ratio) in the tooth number between the sun gear 61 and the ring gear 62. When the carrier 65 is rotated backward by the motor/generator 6 with the ring gear 62 being fixed, as shown in FIG. 9, the sun gear 61 is rotated forward to start the engine 1 coupled thereto.

Figure 10:
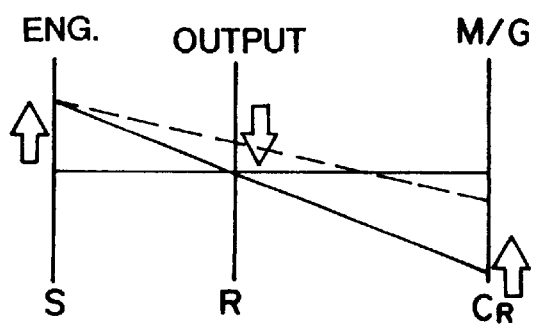
FIG. 10 is a nomographic chart for describing the rotational states of the individual rotary elements in an ETC mode by the hybrid drive system having the construction shown in FIG. 7.

Here will be described an ETC mode at the forward running time. In this ETC mode, the aforementioned system is caused to function as a torque converter, and the second clutch C2 is exclusively applied to couple the output shaft 67 to the ling gear 62. In this mode, the engine 1 is run in the highest efficiency, for example, whereas the motor/generator 6 is so driven that the torque to be established at the ring gear 62 may satisfy the demand of the run. The nomographic chart indicating this state is shown in FIG. 10, for example. A positive torque is generated in the sun gear 61 because the engine 1 is driving, whereas a negative torque is applied to the ring gear 62 by the load for running the vehicle, and the torque outputted by the motor/generator 6 is applied forward to the carrier 65. If the motor/generator 6 is rotated backward in this state, the revolution speed of the ring gear 62 drops to zero to stop the vehicle, as indicated by a solid line in FIG. 10, in dependence upon the revolution speed of the motor/generator 6. In short, the vehicle can be kept in the stopped state while driving the engine 1.

When the revolution speed of the motor/generator 6 is increased in the forward direction (or decreased in the backward direction) by raising the forward output torque of the same from the state indicated by the solid line in FIG. 10, on the other hand, the ring gear 62 acting as the output element rotates forward, as indicated by broken line in FIG. 10, because the revolution speed of the engine 1 and the ring gear 61 integrated with the former is kept constant. Moreover, this torque is amplified from the input torque in accordance with the gear ratio p of the planetary gear mechanism 60. In short, there is established the torque amplifying action. In other words, the motor/generator 6 makes the assist action.

Here will be further described a motor mode. In this mode, the vehicle is run exclusively by the motive power of the motor/generator 6, and only the first clutch C1 is applied to drive the motor/generator 6. In this state, the motor/generator 6, the carrier 65 and the output shaft 67 come into the directly coupled state so that the motive power of the motor/generator 6 is transmitted as it is to the output shaft 67 to run the vehicle.

Here will be further described an engine/motor (Eng.+motor) mode. This is the so-called "directly coupled running mode", in which the first clutch C1 and the second clutch C2 are applied. When these clutches C1 and C2 are applied, the carrier 65 and the ring gear 62 are coupled through the output shaft 67 so that the planetary gear mechanism 60 is integrated as a whole. In other words, the engine 1 and the motor/generator 6 are directly coupled to the output shaft 67. As a result, the motive powers, as outputted from the engine 1 and the motor/generator 6, are inputted as they are through the output shaft 67 to the transmission 68.

Figure 11:
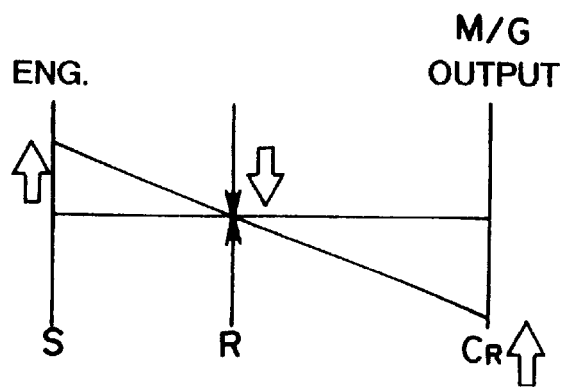
FIG. 11 is a nomographic chart for describing the rotational states of the individual rotary elements in an engine mode at a reverse running time by the hybrid drive system having the construction shown in FIG. 7.

Here will be described modes for the reverse run. This reverse run can be effected with the motive power of the engine 1, with the motive power of the motor/generator 6 and with the motive powers of the engine 1 and the motor/generator 6. Of these, the engine mode will be described first of all. In this mode, the first clutch C1 is applied to couple the output shaft 67 to the carrier 65, and the brake B1 is applied to fix the ring gear 62. This state is illustrated by a nomographic chart in FIG. 11. When the engine 1 is activated, the sun gear 61 is rotated forward with the ring gear 62 being fixed, so that the carrier 65 rotates backward. In other words, the output shaft 67 rotates in the opposite direction to the rotating direction of the engine 1 so that the vehicle is run backward by the motive power of the engine 1.

In the motor reverse mode, on the other hand, the first clutch C1 is exclusively applied. This mode is identical to the aforementioned motor mode for the forward run, and the motor/generator 6 is directly coupled to the output shaft 67 so that the output shaft 67 is reversed by reversing the motor/generator 6. In short, the reverse run is effected by the motive power of the motor/generator 6.

In the electric motor (Eng.+motor) mode for the reverse run, the first clutch C1 and the brake B1 are applied. This is similar to the engine mode for the reverse run. By activating the engine 1, the carrier 65 and the output shaft 67 coupled to the former are rotated backward. Since the motor/generator 6 is always coupled to the carrier 65, however, the motive power of the motor/generator 6 is transmitted to the output shaft 67 to raise the driving force for the reverse run by activating the motor/generator 6 backward. In short, the driving force can be assisted by the motor/generator 6.

Thus, in the hybrid drive system shown in FIG. 7, in the ETC mode, the torque, as outputted by the engine 1, can be amplified and outputted to the output shaft 67 by inputting the torque of the motor/generator 6 to the planetary gear mechanism 60. By controlling the revolution speed of the motor/generator 6, moreover, the rotation of the output shaft 67 can be stopped with the engine 1 being left active. As a result, the planetary gear mechanism 60 can function like the torque converter.

Moreover, the reverse run can be effected exclusively by the motive power of the engine 1. As the transmission 68, therefore, there can be adopted a transmission which cannot set a reverse stage like the aforementioned continuously variable transmission. Still moreover, the engine 1 can be rotated and started by the motive power of the motor/generator 6. As a result, the aforementioned hybrid drive system can eliminate the starter motor which has been indispensable in the prior art.

In the hybrid drive system, in the ETC mode for the forward run, the output shaft 67 is coupled to the using gear 62 by the second clutch C2. At the reverse run by the motive power of the engine 1, on the other hand, the output shaft 67 is coupled to the carrier 65 by the first clutch C1. By thus changing the rotary element to be coupled to the output shaft 67, the so-called "ETC mode" and the reverse run by the engine 1 can be effected so that the individual clutches C1 and C2 act as the so-called "output switching clutches".

Figure 12:
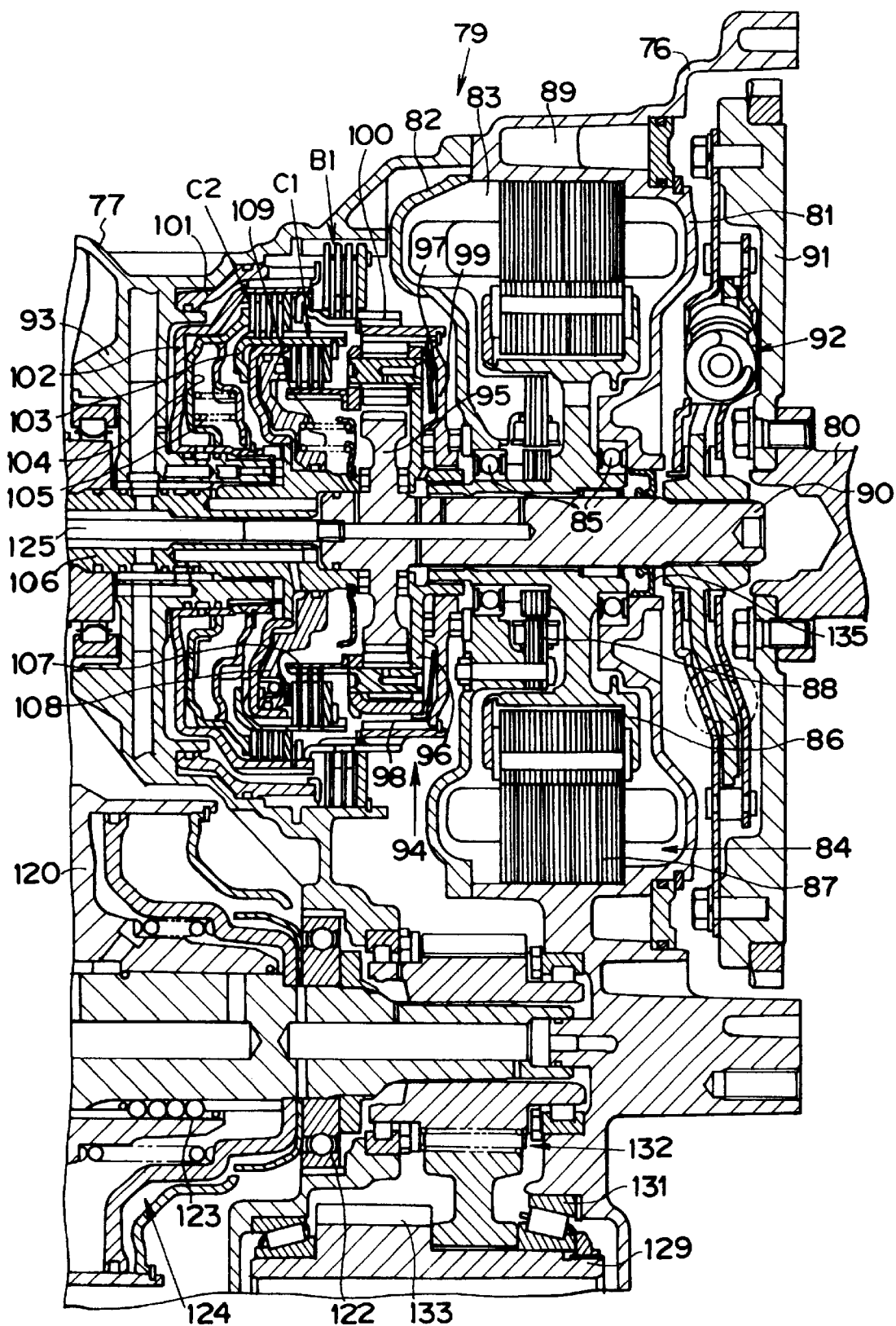
FIG. 12 is a section showing a portion of an embodied example of the hybrid drive system having the construction shown in FIG. 7.
Figure 13:
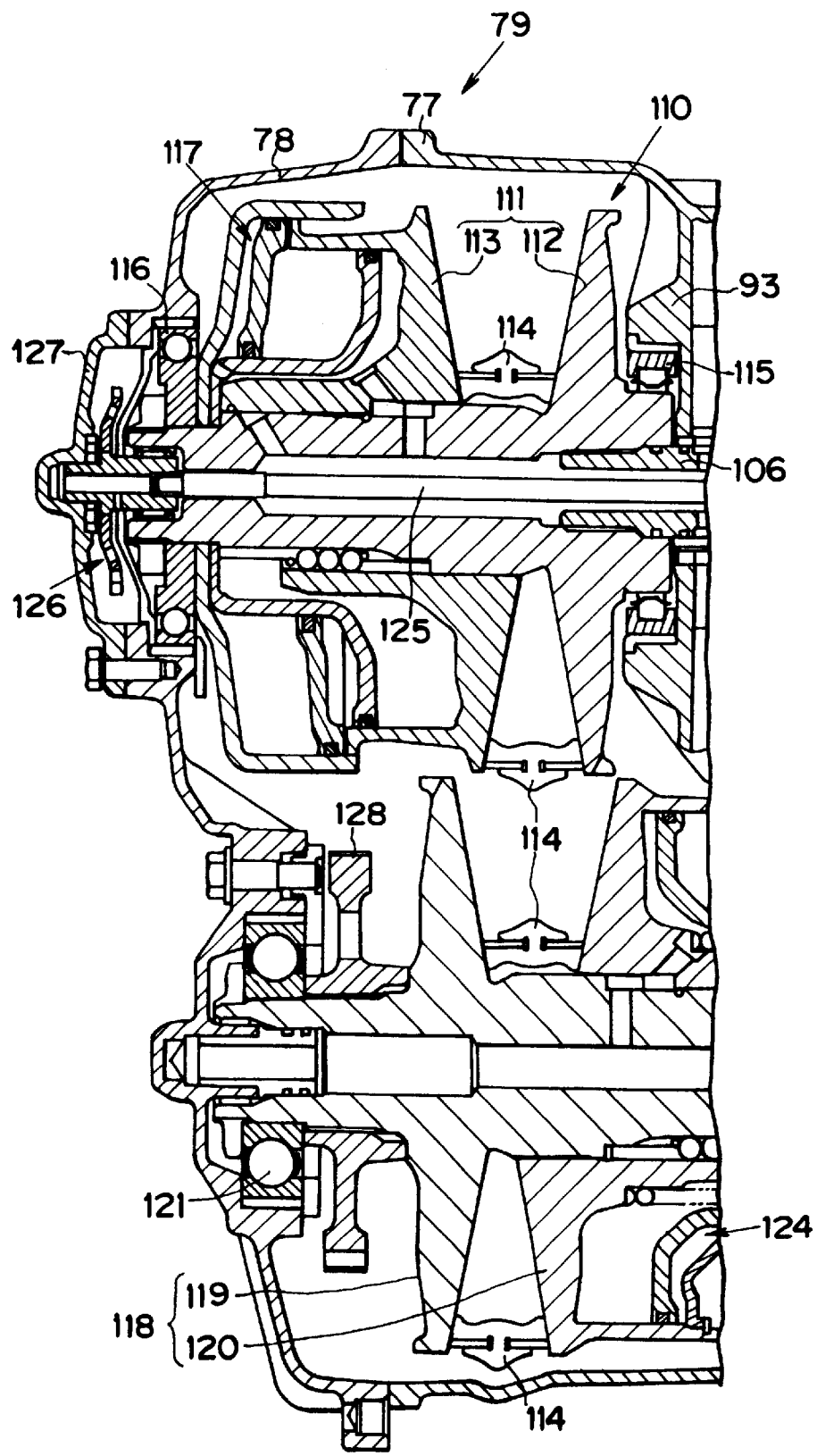
FIG. 13 is a section showing another portion of the embodied example of the hybrid drive system having the construction shown in FIG. 7.
Figure 14:
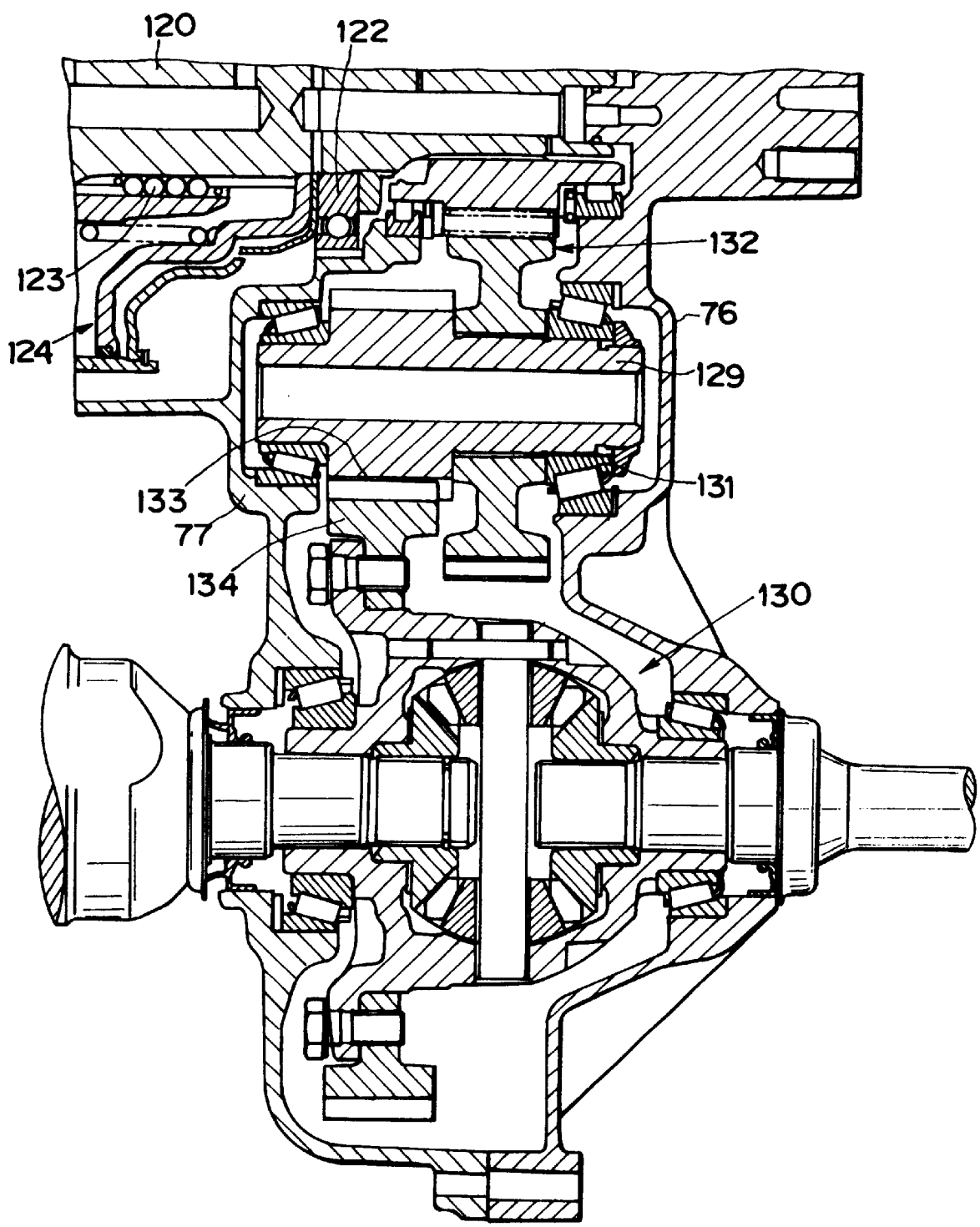
FIG. 14 is a section showing still another portion of the embodied example of the hybrid drive system having the construction shown in FIG. 7.

An example embodying the hybrid drive system thus far described is shown in FIGS. 12 to 14. The hybrid drive system is shown to include a front case 76, a mid case 77 and a rear case 78, which form a casing 79 altogether. The front case 76 is so constructed that it is to be connected to the engine and that a partition 81 having a through hole aligned with the axis of the output shaft 80 of the engine is formed therein. On the open end on the side opposed to the engine across the partition 81, there is mounted a cover 82. Between this cover 82 and the partition 81, there is formed a motor chamber 83, in which a motor/generator 84 is housed.

In the cover 82, as in the partition 81, there is formed a through whole which is aligned with the output shaft 80 so that a rotor 86 is rotatably retained by a bearing 85 which is fitted in the inner circumferences of the partition 81 and the cover 82. The rotor 86 is constructed by mounting a permanent magnet on the outer circumference of the flange portion which is protruded radially outward from a boss portion supported by the bearing 85. At a position radially confronting the permanent magnet, there is arranged a stator 87. This stator 87 is fixed on the inner circumference of the front case 76. Between the boss portion of the rotor 86 and the inner wall face of the cover 82, on the other hand, there is arranged a resolver 88. Here, the bearing 85 is preferably exemplified by one having a seal member for retaining the liquid-tightness of the motor chamber 83.

Around this motor chamber 83, there is formed a hollow portion 89 having a liquid-tight structure, which is fed with cooling water to cool the motor/generator 84. In other words, this hollow portion 89 provides a water jacket.

The rotor 86 is made hollow at its boss portion to receive an input shaft 90 rotatably. This input shaft 90 is protruded through the partition 81 toward the engine and is connected at its protruded end to the output shaft 80 of the engine through a drive plate 91. Specifically, this drive plate 91 is one having a high inertial moment by increasing the mass on its outer circumferential side and is mounted on the output shaft 80 of the engine. Moreover, the drive plate 91 is equipped with a damper mechanism 92 having an elastic member such as a coil spring arranged in integrally fitted on the leading end portion of the input shaft 90.

At an axially intermediate portion of the mid case 77 connected to the front case 76, there is formed a partition 93 which has a through hole aligned with the input shaft 90. In the hollow portion formed between the partition 93 and the cover 82, there are housed a planetary gear mechanism 94, the brake B1 and the two clutches C1 and C2.

This planetary gear mechanism 94 is exemplified by the aforementioned double pinion type planetary gear mechanism which is arranged adjacent to the cover 82. The planetary gear mechanism 94 has a sun gear 95 integrated with the input shaft 90. On the other hand, the boss portion of the rotor 86 is extended along the outer circumference of the input shaft 90 toward the planetary gear mechanism 94 so that a carrier 96 is splined on the outer circumference of the extended leading end of the boss portion (i.e., the hollow shaft). On the face of the carrier 96 on the side of the cover 82, there is mounted a guide plate 97 for guiding the lubricating oil, as might otherwise be radially splashed, toward the pinion gear.

A ring gear 98 is a cylindrical member, and a retainer 99 for supporting the ring gear 98 axially and radially is connected to the inner circumference of one axial end portion of the ring gear 98. The retainer 99 is arranged between the carrier 96 and the cover 82 and is positioned not only axially by a thrust bearing arranged between those carrier 96 and cover 82 but also radially by fitting it rotatably in the boss portion of the carrier 96.

On the outer circumference of the ring gear 98, there is integrally fixed a brake hub 100 having a cylindrical shape. A plurality of function discs, as splined on the brake hub 100, and a plurality of friction discs, as splined on the inner circumference of the mid case 77, are alternately arranged in the axial direction to construct the brake B1.

In the intersecting portion between the partition 93 and the inner circumference of the mid case 77, there is formed a hollow portion which is opened toward the brake B1 and in which a piston 101 is so arranged as to move back and forth in the axial directions. The leading end portion of the piston 101 is extended to the vicinity of the brake B1 so that the piston 101 is moved rightward of FIG. 12 to push the friction discs thereby to apply the brake B1 by feeding the oil pressure to the back side of the piston 101.

In the inner circumference of the piston 101, there is arranged a clutch drum 102 for the second clutch C2. This clutch drum 102 is a hollow member having a bottomed cylindrical shape and a side wall portion along the partition 93. The clutch drum 102 is rotatably retained by the boss portion of the partition 93. In the inner circumference of the cylindrical portion of the clutch drum 102, there are splined the leading end of the brake hub 100 and a plurality of friction discs. Between these friction discs, there are alternately arranged other friction discs. These other friction discs are splined on the outer circumference of a clutch drum 103 for the first clutch C1, as arranged in the inner circumference of the clutch drum 102, thereby to construct the second clutch C2.

A piston 104 for pushing those friction discs to apply the second clutch C2 is so fitted in the inner circumference of the clutch drum 102 as to move back and forth in the axial directions. The back side of the piston 104, i.e., the inside of the clutch drum 102 is fed with the oil pressure by way of an oil passage formed in the partition 93. On the front side (on the righthand side of FIG. 12) of the piston 104, there is arranged a return spring 105 which is retained by a retainer.

In and through the inner circumference of the partition 93, there is rotatably retained an output shaft 106, the rear end portion (as located at the righthand side of FIG. 12), which is rotatably fitted on the leading end portion of the input shaft 90. At the end portion of the output shaft 106 on the side of the input shaft 90, there is formed a radially protruded flange portion, to which the clutch drum 103 is integrally connected. As a result, the ring gear 98 and the output shaft 106 are selectively coupled by the second clutch C2.

The clutch drum 103 is provided for the first clutch C1. On the inner circumference of the clutch drum 103, there are splined a plurality of friction discs. Alternately of these friction discs, there are axially arranged friction discs which are splined on the outer circumference of a clutch hub 107 integrated with the carrier 96. In short, these friction discs construct the first clutch C1. A piston 108 for applying the first clutch C1 is retained by the radially extending flange portion of the output shaft 106. The oil pressure for actuating the piston 108 is fed to the back side of the piston 108 from the partition 93 through the inside of the output shaft 106. A return spring 109 for returning the piston 108 is arranged on the front face of the piston 108.

In the hybrid drive system thus far described, the torque to be generated by the motor/generator 84 is raised by arranging the rotor 86 and the stator 87 on the radially outer side as far as possible, as shown in FIG. 12. By inserting a portion of the planetary gear mechanism 94 into the space formed on the inner circumferential side of the stator 87, on the other hand, the space is effectively utilized to shorten the axial size.

In the hollow portion between the rear case 78 connected to the mid case 77 and the partition 93, there is arranged a transmission 110. This transmission 110 is exemplified by the aforementioned belt type continuously variable transmission in which a drive pulley 111 is arranged in alignment with the output shaft 106. This drive pulley 111 is composed of a stationary sheave 112 and a movable sheave 113 which are tapered at their confronting wall faces to form a groove portion for clamping a belt 114. The stationary sheave 112 is equipped with a hollow stem portion and is rotatably supported by the partition 93 through a bearing 115 fitted on the outer circumference of one end portion of the stem portion. The leading end portion of the output shaft 106 is inserted into and splined in that hollow portion. The other end portion of the stationary sheave 112 is rotatably retained by a bearing 116 which is mounted in the inner circumferential portion of the rear case 78. The movable sheave 113 is so fitted on the outer circumference of the hollow stem portion of the stationary sheave 112 as to slide in the axial directions. This movable sheave 113 is constructed to be moved toward the stationary sheave 112 by a double piston type hydraulic servo mechanism 117.

In parallel with the drive pulley 111, there is provided a driven pulley 118. This driven pulley 118 is composed, like the drive pulley 111, of a stationary sheave 119 and a movable sheave 120. The belt 114 is wonded in the groove portion which is defined between those individual sheaves 119 and 120. The stationary sheave 119 is equipped with a hollow stem portion, one end portion (the lefthand side end portion of FIG. 13) of which is rotatably retained by the rear case 78 through a bearing 121 and the other end portion of which is rotatably retained by the partition 93 through a bearing 122. The movable sheave 120 is so fitted on the outer circumference of the hollow stem of the stationary sheave 119 as to move in the axial directions. Between the movable sheave 120 and the hollow stem portion of the stationary sheave 119, there is interposed a ball spline 123 for moving the movable sheave 120 smoothly in the axial directions and for rotating the same integrally with the stationary sheave 119. On the back side (on the righthand side of FIG. 13) of the movable sheave 120, there is disposed a hydraulic servo mechanism 124 for pushing the movable sheave 120 toward the stationary sheave 119.

The gear ratio of the transmission 110 is controlled by feeding the individual oil pressure servo mechanisms 117 and 124 with the oil pressure, and this control is substantially similar to that by the belt type continuously variable transmission of the prior art. Specifically, the hydraulic servo mechanism 124 on the side of the driven pulley 118 is fed with the oil pressure according to a demanded torque, and the hydraulic servo mechanism 117 on the side of the drive pulley 111 is fed with the oil pressure for setting a demanded gear ratio. While a predetermined tension is being applied to the belt 114 by the oil pressure on the side of the driven pulley 118, more specifically, the oil pressure on the side of the drive pulley 111 is raised to reduce the groove width of the drive pulley 111 so that the winding radius of the belt 114 is enlarged to lower the gear ratio. When the oil pressure on the side of the drive pulley 111 is lowered, on the contrary, the groove width of the drive pulley 111 is enlarged by the tension applied to the belt 114 so that the winding radius of the belt 114 is reduced to raise the gear ratio.

In the output shaft 106 and the stationary sheave 112, there is arranged a pump shaft 125 which extends through and along the center axis. The pump shaft 125 is splined at its one end portion in the input shaft 90. On the leading end portion of the pump shaft 125, there is mounted a chain sprocket 126. This chain sprocket 126 transmits the driving force to the not-shown oil pump. This chain sprocket 126 and the not-shown chain are covered with an end cover 127. On the other hand, numeral 128 in FIG. 13 designates a parking gear which is splined on the stationary sheave 119 of the driven pulley 118.

The front case 76 and the mid case 77 are provided with radially protruded portions housing a counter shaft 129 and a differential 130. The counter shaft 129 is a relatively short rotary shaft which is rotatably retained at its both end portions by bearings 131 and which is connected to the stem portion of the stationary sheave 119 of the driven pulley 118 by a pair of counter gears 132. At this counter shaft 129, there is integrally formed another gear 133 which meshes with a ring gear 134 (or an output gear) in the differential 130. Here, numeral 135 in FIG. 12 designates a seal member which seals up the partition 81 and the input shaft 90 liquid-tight in the front case 76.

With the construction shown in FIGS. 12 to 14, the motor/generator 84 having the large external diameter is arranged adjacent to the drive plate 91, and the brake B1 and the clutches C1 and C2 are arranged on the side of the continuously variable transmission 110. As a result, the members having the similar sizes of the external diameter are arranged adjacent to each other so that the system can be made wholly compact.

Figures 15, 16:
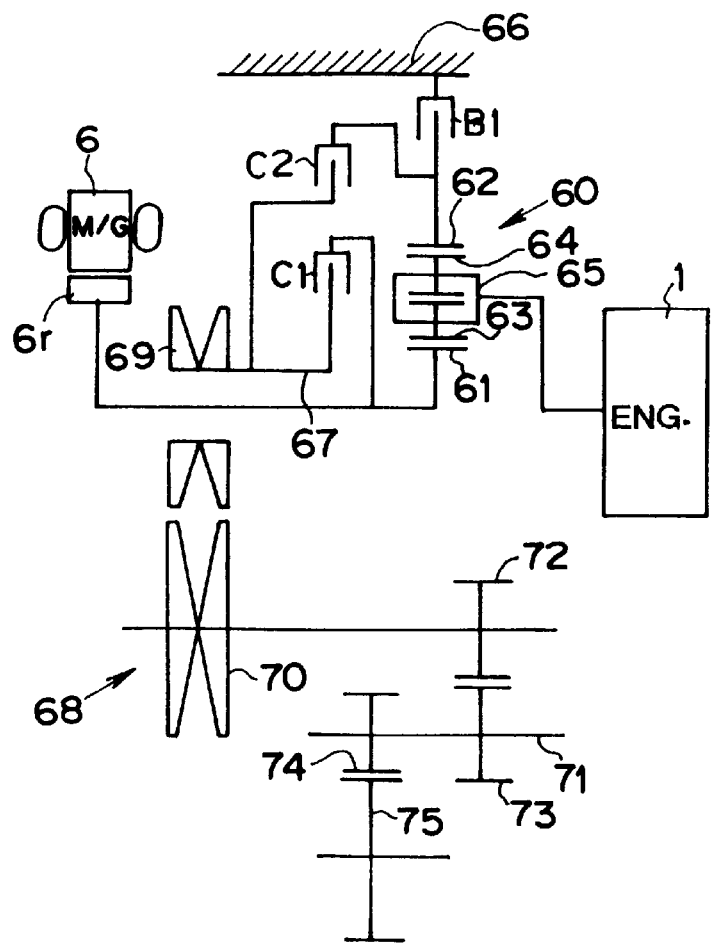
FIG. 15 is a skeleton diagram showing another example of the invention.
FIG. 16 is a table enumerating the applied/released states of a frictional engagement device for setting individual drive modes in a hybrid drive system having the construction shown in FIG. 15.

Here will be described still another example of the invention. The example shown in FIG. 15 is modified in the arrangement and the coupling relation from the construction shown in FIG. 7. Specifically, the engine 1 is always connected to the carrier 65 whereas the motor/generator 6 is always coupled to the sun gear 61. Since the coupling relations to the engine 1 and the motor/generator 6 are thus modified from those of the construction shown in FIG. 7, the first clutch C1 is so arranged as to couple the output shaft 67 and the sun gear 61 selectively. On the other hand, the motor/generator 6 is arranged on the side opposed to the individual clutches C1 and C2 across the transmission 68. As a result, the shaft for connecting the motor/generator 6 and the sun gear 61 is extended through and along the center axis of the drive pulley 69.

Figure 17:
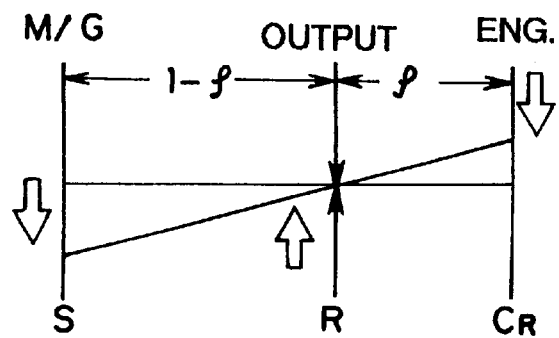
FIG. 17 is a nomographic chart for describing the rotational states of individual rotary elements in an engine start mode by the hybrid drive system having the construction shown in FIG. 15.

This hybrid drive system having construction shown in FIG. 15 can establish running modes (or drive modes) similar to those of the hybrid drive system shown in FIG. 7. In the engine start mode shown in FIG. 16, specifically, the second clutch C2 and the brake B1 are applied. With the ring gear 62 being fixed, therefore, the sun gear 61 is rotated by the motor/generator 6 so that the carrier 65 rotates in the opposite direction to the sun gear 61. This state is shown as a nomographic chart in FIG. 17, in which the carrier 65 and the engine 1 connected to the former are rotated forward by rotating the motor/generator 6 backward. In this state, therefore, the engine 1 can be started by feeding it with the fuel and by igniting it, if necessary.

Figure 18:
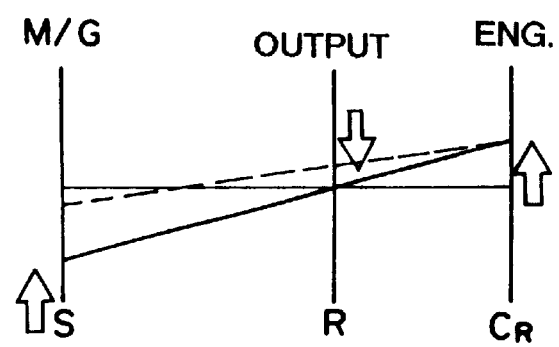
FIG. 18 is a nomographic chart for describing the rotational states of the individual rotary elements in an ETC mode by the hybrid drive system having the construction shown in FIG. 15.

The ETC mode for the forward run is set by applying the second clutch C2 exclusively. This setting is made, as in the example shown in FIG. 7, by coupling the rotary element, which is uncoupled from the engine 1 and the motor/generator 6, to the output shaft 67. In this state, the motor/generator 6 and the engine 1 are coupled to the sun gear 61 and the carrier 65, which act as reaction elements against each other when the ring gear 62 coupled to the output shaft 67 is fixed. By activating the engine 1 in the most efficient state and by controlling the output of the motor/generator 6 in that state, therefore, the rotations of the ring gear 62 and the output shaft 67 coupled to the former are stopped, and the output shaft 67 generates the torque which is amplified from the output torque of the engine 1, so that the planetary gear mechanism 60 functions like the torque converter. A nomographic chart in this mode is illustrated in FIG. 18.

The motor drive mode is set by applying the first clutch C1. In other words, the motor/generator 6 is coupled through the sun gear 61 to the output shaft 67. As a result, the vehicle is run by the motive power of the motor/generator 6. If the second clutch C2 is applied in this case, the planetary gear mechanism 60 rotates integrally as a whole so that the engine 1 connected to the carrier 65 rotates forward. In the motor drive mode, therefore, the engine 1 can be started.

In the drive mode by the engine 1 and the motor/generator 6 (i.e., the Eng.+motor mode), the entirety of the planetary gear mechanism 60 is integrated to couple the engine 1 and the motor/generator 6 directly to the output shaft 67. This mode is set by applying the first clutch C1 and the second clutch C2 and is similar to the engine/motor mode in the apparatus shown in FIG. 7.

Figure 19:
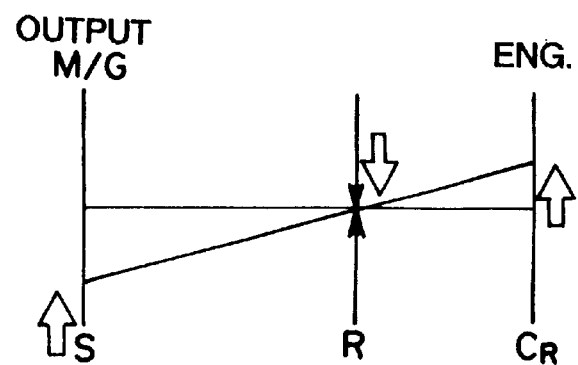
FIG. 19 is a nomographic chart for describing the rotational states of the individual rotary elements in an engine mode at a reverse running time by the hybrid drive system having the construction shown in FIG. 15.

At reverse run times, the vehicle is run by either or both the engine 1 and the motor/generator 6. In the case of a reverse run with the motive power of the engine 1, specifically, the first clutch C1 and the brake B1 are applied to fix the ring gear 62 and to couple the sun gear 61 to the output shaft 67, and the carrier 65 is rotated forward in this state by the engine 1. As a result, as shown in a nomographic chart of FIG. 19, the sun gear 61 and the output shaft 67 coupled to the former rotate backward to effect the reverse run.

In the case of a reverse run by the motor/generator 6, on the other hand, the first clutch C1 is applied because it is sufficient to couple the motor/generator 6 directly to the output shaft 67. In this case, moreover, the second clutch C2 may be additionally applied to prevent the relative rotations between the rotary elements in the planetary gear mechanism 60. This operation is similar to that of the system shown in FIG. 7.

In the case of a reverse run with the motive powers of both the engine 1 and the motor/generator 6, the first clutch C1 and the brake B1 are applied. This operation is similar to that of the engine mode for the reverse run. With the ring gear 62 being fixed, the carrier 65 is rotated by the engine 1 so that the sun gear 61 and the output shaft 67 coupled to the former rotate backward to establish the reverse run. In this case, the motor/generator 6 is rotated backward to apply a backward torque to the sun gear 61 so that the reverse run can be effected by the motive powers of the engine 1 and the motor/generator 6.

With the hybrid drive system thus constructed as shown in FIG. 15, too, the reverse run can be effected by the motive power of the engine 1. Even when the charge of the (not-shown) battery is low, therefore, the driving force for the reverse run will not become short. Since the so-called "ETC mode" can be established, moreover, the output torque of the engine 1 can be amplified by the motor/generator 6 and outputted from the output shaft 67. As a result, a driving torque necessary and sufficient for the start can be established while keeping the engine 1 in the optimum running state. Especially in the construction shown in FIG. 15, still moreover, the motor/generator 6 can be arranged at one axial end portion so that it can be easily cooled down.

Figure 20:
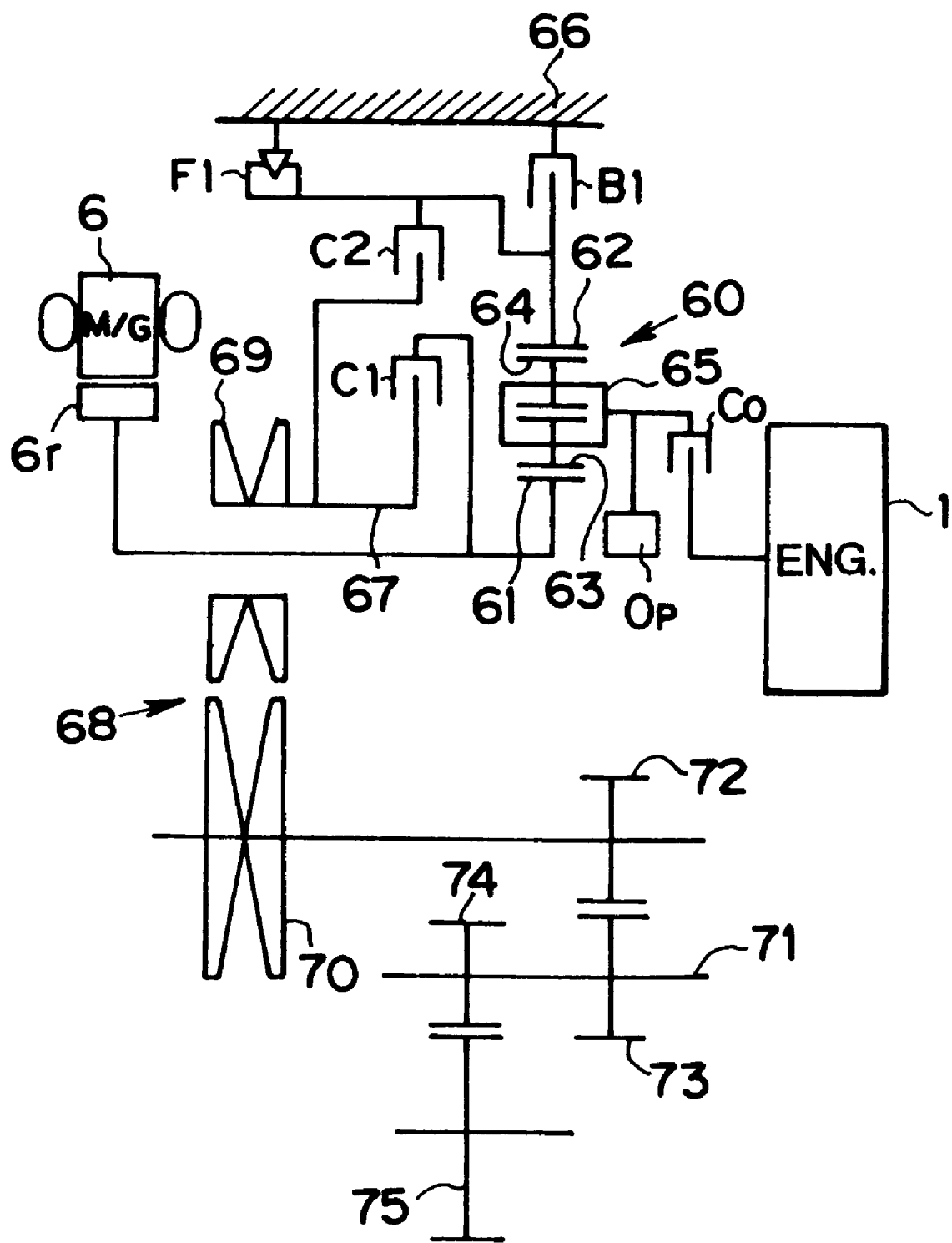
FIG. 20 is a skeleton diagram showing a construction in which an oil pump is added to the hybrid drive system having the construction shown in FIG. 15.

In this construction shown in FIG. 15, as understood from the foregoing description, the carrier 65 always rotates forward. By making use of this, the construction may have a built-in oil pump Op, as exemplified in FIG. 20. This construction shown in FIG. 20 is improved over the construction shown in FIG. 15 such that the oil pump Op is connected to the carrier 65, such that a clutch C0 is arranged between the carrier 65 and the engine 1, and such that a one-way clutch F1 is arranged in parallel with the brake B1. The remaining construction is identical to that shown in FIG. 15.

With this construction, even in any drive mode for the forward and reverse runs, the oil pump Op can be normally driven to generate the necessary oil pressure by the forward rotations of the carrier 65.

Figures 21, 22:
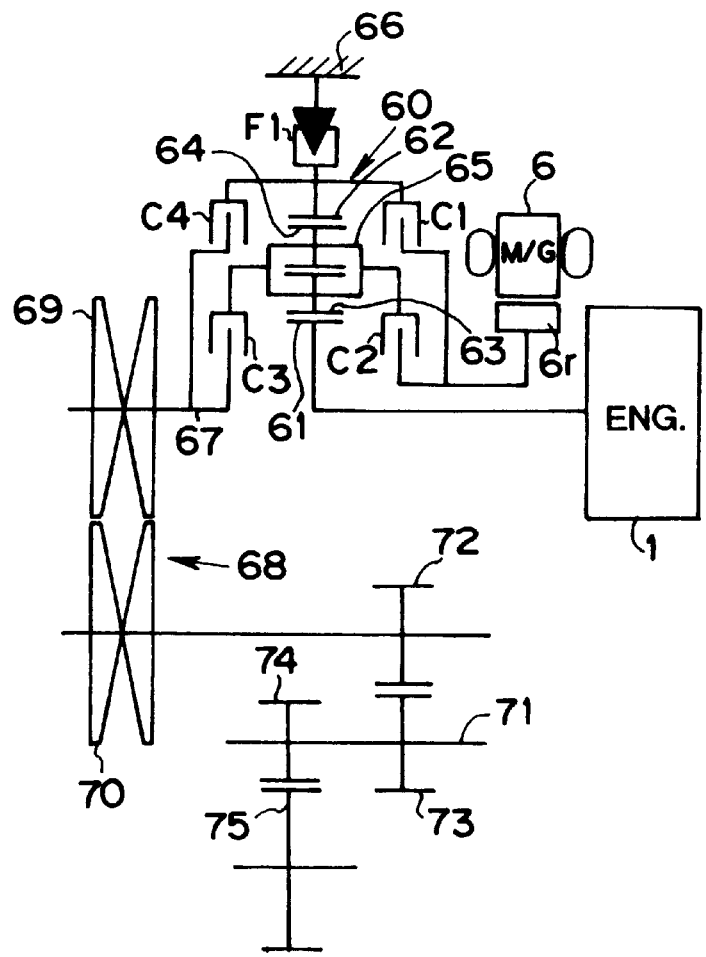
FIG. 21 is a skeleton diagram showing still another example of the invention.
FIG. 22 is a table enumerating the applied/released states of a frictional engagement device for setting individual drive modes in a hybrid drive system having the construction shown in FIG. 21.

Although the foregoing individual examples are constructed to change the output elements, the invention can be additionally constructed to modify the elements for inputting the motive power of the motor/generator 6, as exemplified in FIG. 21. This example shown in FIG. 21 is improved over the construction shown in FIG. 7 such that the first input clutch C1 is arranged between the motor/generator 6 and the ring gear 62, such that the second input clutch C2 is arranged between the motor/generator 6 and the carrier 65, such that a first output clutch C3 corresponding to the first clutch shown in FIG. 7 is arranged between the carrier 65 and the output shaft 67, and such that a second output clutch C4 corresponding to the second clutch shown in FIG. 7 is arranged between the ring gear 62 and the output shaft 67. Moreover, the brake shown in FIG. 7 is replaced by the one-way clutch F1 which is arranged between the ring gear 62 and the casing 66.

Figure 23:
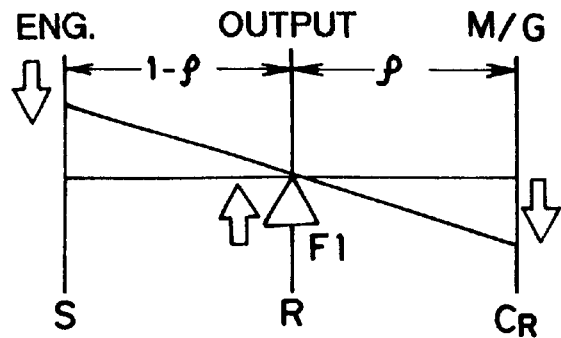
FIG. 23 is a nomographic chart for describing the rotational states of individual rotary elements in an engine start mode by the hybrid drive system having the construction shown in FIG. 21.

Here will be described the actions, i.e., the individual drive modes of the hybrid drive system shown in FIG. 21. According to this hybrid drive system, it is possible to set the seven modes, as enumerated in FIG. 22. An engine start mode will be described first of all. In this mode, the second input clutch C2 is applied. Specifically, the motor/generator 6 is coupled to the carrier 65. A nomographic chart in this state is illustrated in FIG. 23. When the carrier 65 is rotated backward by the motor/generator 6, the load of the engine 1 is applied to the sun gear 61 so that the ring gear 62 will rotate backward. Since the one-way clutch F1, as coupled to the ring gear 62, is applied when the backward torque is applied to the rotational side member (e.g., the inner race), the ring gear 62 is fixed by the backward rotation of the motor/generator 6 so that the sun gear 61 and the engine 1 coupled to the former rotate forward. In this state, therefore, the engine 1 can be started by feeding it with the fuel or by igniting it, if necessary. Here in this engine start mode, the second output clutch C4 may be applied to stop the rotation of the output shaft 67.

Figure 24:
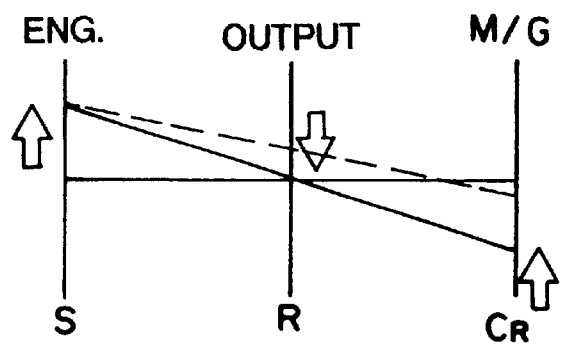
FIG. 24 is a nomographic chart for describing the rotational states of the individual rotary elements in an ETC mode by the hybrid drive system having the construction shown in FIG. 21.

On the other hand, the ETC mode for the forward run is set by applying the second input clutch C2 and the second output clutch C4. Specifically, the motor/generator 6 is coupled to the carrier 65, and the output shaft 67 is applied to the ring gear 62. This establishes the same coupling state and power input/output state as those in the ETC mode at the forward run with the hybrid drive system shown in FIG. 7. As apparent from a nomographic chart illustrated in FIG. 24, therefore, the torque outputted from the engine 1 can be amplified by the motor/generator 6 and outputted to the output shaft 67, and the rotation of the output shaft 67 can be stopped while leaving the engine 1 rotating.

On the other hand, the motor drive mode is set by applying the second input clutch C2 and the first output clutch C3. By coupling the motor/generator 6 to the carrier 65 and by coupling the output shaft 67 to the carrier 65, specifically, the motor/generator 6 and the output shaft 67 are directly coupled through the carrier 65. As a result, the vehicle can run forward with the motive power of the motor/generator 6.

In the engine/motor mode, any three of the aforementioned four clutches are applied. As shown in FIG. 22, for example, the individual input clutches C1 and C2 and the first output clutch C3 are applied. As a result, the motor/generator 6 is coupled to the planetary gear mechanism 60, and the planetary gear mechanism 60 is integrated as a whole to couple its carrier 65 to the output shaft 67. As a result, the motive powers of the engine 1 and the motor/generator 6 are transmitted through the planetary gear mechanism 60 to the output shaft 67 so that the forward run can be made by the motive power of the engine 1 and the motive power of the motor/generator 6.

Figure 25:
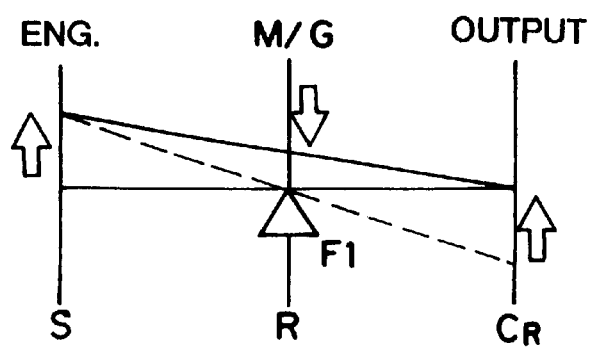
FIG. 25 is a nomographic chart for describing the rotational states of the individual rotary elements in an engine mode at a reverse running time by the hybrid drive system having the construction shown in FIG. 21.

As the modes for the reverse run, there can be achieved the engine mode and the motor mode. In the engine mode, the first input clutch C1 and the first output clutch C3 are applied. Specifically, the motor/generator 6 is coupled to the ring gear 62, and the output shaft 67 is coupled to the carrier 65. A nomographic chart in this state is illustrated in FIG. 25. When the engine 1 is activated to transmit the forward torque to the sun gear 62, a forward torque is established at the ring gear 62 because the load from the output shaft 67 is applied to the carrier 65. When an overcoming torque is applied to the ring gear 62 by the motor/generator 6, the revolution speed of the ring gear 62 is suppressed so that the carrier 65 and the output shaft 67 coupled to the former are accordingly rotated backward. Here, the ring gear 62 is coupled to the one-way clutch F1 so that its forward rotation can be lowered so far as it is stopped by the one-way clutch F1. In this engine mode for the reverse run, more specifically, the reverse running state is set by the motor/generator 6, and its driving torque is controlled by the motor/generator 6.

In the motor mode for the reverse run, on the other hand, the motor/generator 6 is directly coupled to the output shaft 67. As in the motor mode for the forward run, therefore, the second input clutch C2 and the first output clutch C3 are applied. Since the motor/generator 6 and the output shaft 67 are directly coupled in this state, the output shaft 67 is rotated backward to effect the reverse run by rotating the motor/generator 6 backward.

Here, the aforementioned example shown in FIG. 21 is modified from the construction shown in FIG. 7 such that the clutch mechanisms are additionally interposed between the carrier 65 and the motor/generator 6 and between the ring gear 62 and the motor/generator 6, and such that the brake is replaced by the one-way clutch. Similar modifications can also be made on the construction shown in FIG. 15. Specifically, what is provided is the means for uncoupling the motor/generator 6 from the planetary gear mechanism 60. When the vehicle is run with the motive power of the engine 1 while demanding no power generation, the motor/generator 6 can be uncoupled to prevent the power loss.

Figures 26, 27:
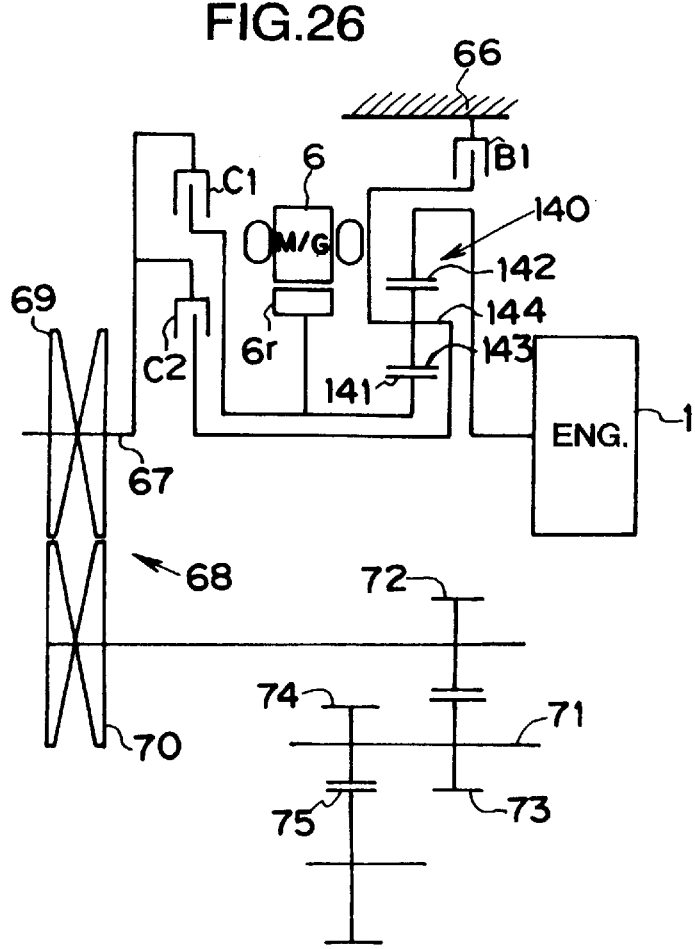
FIG. 26 is a skeleton diagram showing still another example of the invention.
FIG. 27 is a table enumerating the applied/released states of a frictional engagement device for setting individual drive modes in a hybrid drive system having the construction shown in FIG. 26.

Here will be described an example in which the single pinion type planetary gear mechanism is employed in place of the foregoing double pinion type planetary gear mechanism. As shown in FIG. 26, this example employs a single pinion type planetary gear mechanism 140 for transmitting the motive powers of the engine 1 and the motor/generator 6 individually or synthetically to the output shaft 67. This single pinion type planetary gear mechanism 140 comprises rotary elements: a sun gear 141 acting as an external gear; a ring gear 142 acting as an internal gear arranged concentrically with the sun gear 141; and a carrier 144 retaining a pinion gear 143 meshing with those sun gear 141 and ring gear 142 rotatably and revolvably.

To the sun gear 141, there are coupled the motor/generator 6 and the output shaft 67 through the first clutch C1. To the ring gear 142, on the other hand, there is connected the engine 1. There is further provided the brake B1 for fixing the carrier 144 selectively. Between this carrier 144 and the output shaft 67, there is interposed the second clutch C2. In short, this construction shown in FIG. 26 is modified from the foregoing construction shown in FIG. 15 such that the double pinion type planetary gear mechanism is replaced by the single pinion type planetary gear mechanism so that the coupling relations of the power units and the frictional engagement devices to the carrier and the ring gear are accordingly changed.

In the hybrid drive system having the construction shown in FIG. 26, therefore, it is possible to set drive modes similar to those of the system having the construction shown in FIG. 15. Moreover, the applied/released states of the clutches C1 and C2 and the brake B1 in the individual modes are identical to those of the system shown in FIG. 15. An applied/released state table for setting the individual drive modes is presented in FIG. 27. Here in FIG. 27, the second clutch C2 is released in the motor modes for the forward run and for the reverse run. Since the planetary gear mechanism 140 is integrated as a whole in the motor modes, however, the second clutch C2 may be applied as in the case of the system shown in FIG. 15.

Figure 28:
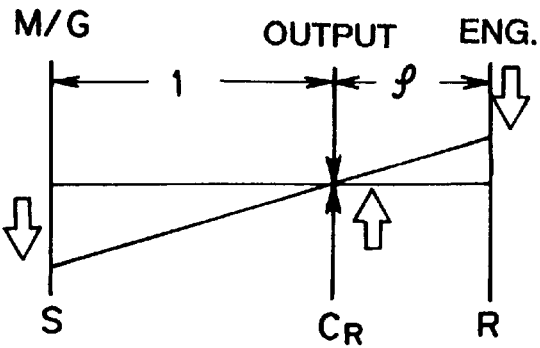
FIG. 28 is a nomographic chart for describing the rotational states of individual rotary elements in an engine start mode by the hybrid drive system having the construction shown in FIG. 26.

Here will be described the individual drive modes. In the engine start mode, the second clutch C2 and the brake B1 are applied. With the carrier 144 being fixed, therefore, the sun gear 141 is rotated by the motor/generator 6 so that the ring gear 142 rotates in the opposite direction to the sun gear 141. This state is illustrated by a nomographic chart in FIG. 28. By rotating the motor/generator 6 backward, the ring gear 142 and the engine 1 coupled to the former rotate forward. In this state, therefore, the engine 1 can be started by feeding it with the fuel or by igniting it, if necessary.

Figure 29:
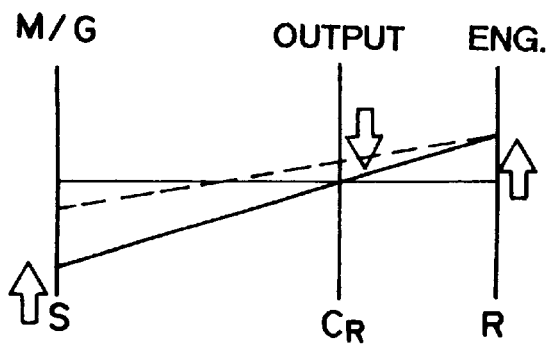
FIG. 29 is a nomographic chart for describing the rotational states of the individual rotary elements in an ETC mode by the hybrid drive system having the construction shown in FIG. 26.

The ETC mode for the forward run is set by applying the second clutch C2 exclusively. Specifically, the rotary element, as uncoupled from the engine 1 or the motor/generator 6, is coupled to the output shaft 67. In this state, the motor/generator 6 and the engine 1 are coupled to the sun gear 141 and the ring gear 142 which act as reaction elements against each other when the carrier 144 coupled to the output shaft 67 is fixed. By activating the engine 1 in the most efficient state, for example, to control the output of the motor/generator 6 in this state, the rotations of the carrier 144 and the output shaft 67 coupled to the former are stopped, and the torque, as amplified from the output torque of the engine 1, is established at the output shaft 67, so that the planetary gear mechanism 140 functions like the torque converter. A nomographic chart in this mode is illustrated in FIG. 29. The motor drive mode is set by applying the first clutch C1. In other words, the motor/generator 6 is coupled to the output shaft 67. As a result, the vehicle can be run with the motive power of the motor/generator 6.

In the drive mode by the engine 1 and the motor/generator 6 (i.e., the Eng.+motor mode), the planetary gear mechanism 140 is integrated as a whole to couple the engine 1 and the motor/generator 6 directly to the output shaft 67. This mode is set by applying the first clutch C1 and the second clutch C2. This operation is similar to the engine/motor mode in the system shown in FIG. 7 or 15.

Figure 30:
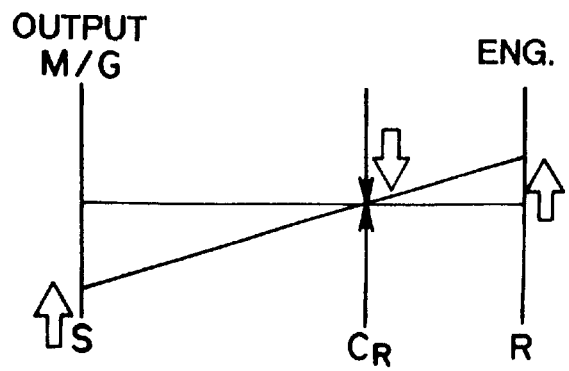
FIG. 30 is a nomographic chart for describing the rotational states of the individual rotary elements in an engine mode at a reverse running time by the hybrid drive system having the construction shown in FIG. 26.

The reverse runs can be effected by either or both the engine 1 and the motor/generator 6. For the reverse run with the motive power of the engine 1, the first clutch C1 and the brake B1 are applied to rotate the ring gear 142 forward by the engine 1 with the carrier 144 being fixed and the sun gear 141 being coupled to the output shaft 67. As a result, the sun gear 141 and the output shaft 67 coupled to the former rotate backward, as illustrated by a nomographic chart in FIG. 30, to effect the reverse run.

For the reverse run with the motor/generator 6, on the other hand, the first clutch C1 is applied because it is sufficient to couple the motor/generator 6 directly to the output shaft 67. In this case, moreover, the second clutch C2 may be additionally applied to prevent the relative rotations between the rotary elements in the planetary gear mechanism 140.

For the reverse run with the motive powers of both the engine 1 and the motor/generator 6, the first clutch C1 and the brake B1 are applied. This operation is similar to that of the engine mode at the reverse running time. With the carrier 144 being fixed, the ring gear 142 is rotated by the engine 1 so that the sun gear 141 and the output shaft 67 coupled to the former rotate backward to establish the reverse run. In this case, the reverse run can be effected by the motive powers of the engine 1 and the motor/generator 6 by rotating the motor/generator 6 backward to apply the backward torque to the sun gear 141.

With the hybrid chive system thus constructed as shown in FIG. 26, too, the reverse run can be effected by the motive power of the engine 1. Even when the state of charge of the (not-shown) battery is low, therefore, the driving force for the reverse run will not become short. Since the so-called "ETC mode" can be established, moreover, the output torque of the engine 1 can be amplified by the motor/generator 6 and outputted from the output shaft 67. As a result, a driving torque necessary and sufficient for the start can be established while keeping the engine 1 in the optimum running state.

Figure 31:
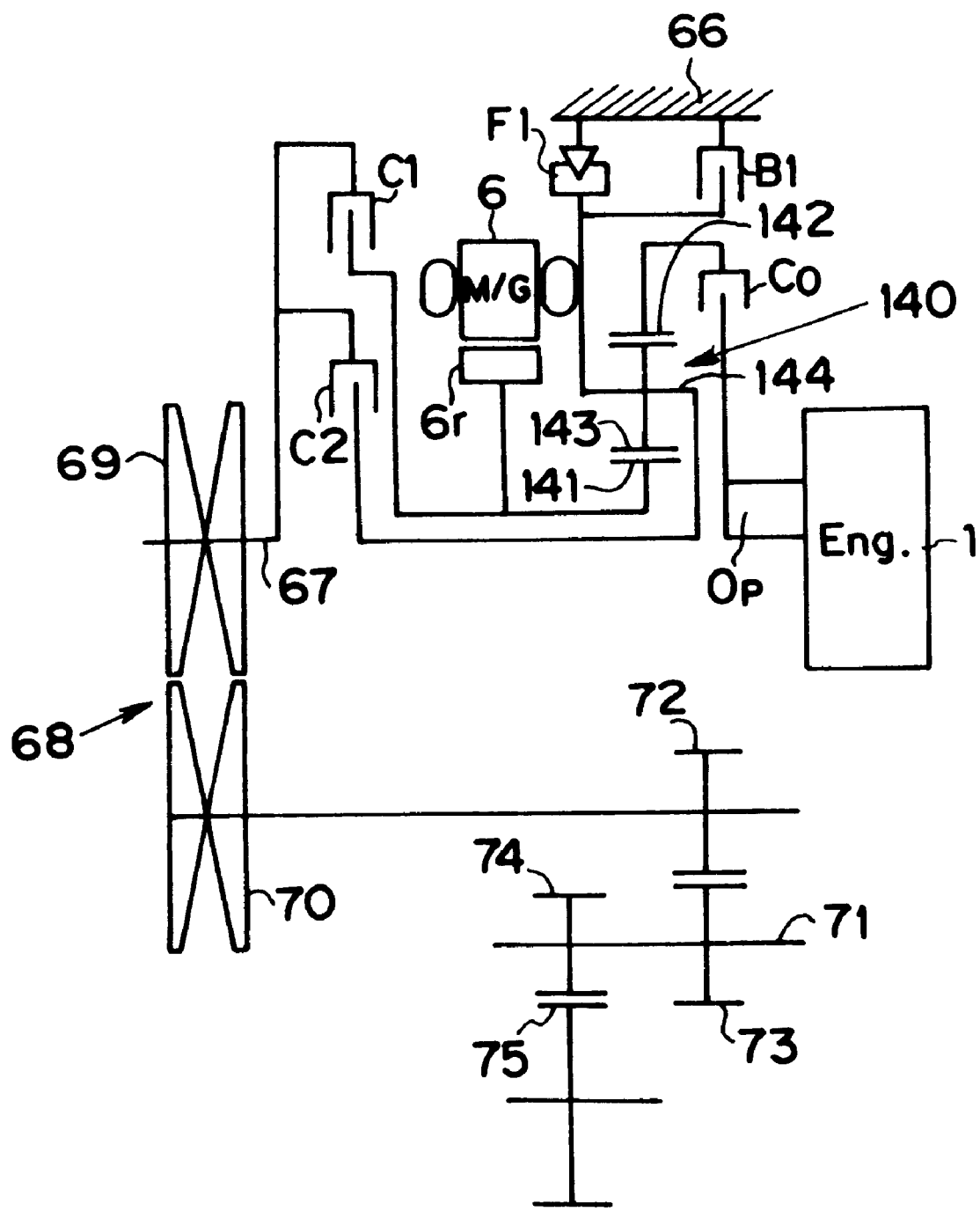
FIG. 31 is a skeleton diagram showing a construction in which an oil pump is added to the hybrid drive system having the construction shown in FIG. 26.

A construction, in which the oil pump Op is added to the construction shown in FIG. 26, is shown in FIG. 31. The clutch C0 is arranged between the ling gear 142 and the engine 1, and the oil pump Op is connected to the output shaft of the engine 1. In parallel with the brake B1, moreover, there is arranged the one-way clutch F1. The remaining construction is similar to that shown in FIG. 26.

Here in the example shown in FIG. 26, the motor/generator 6 is arranged at the axially central portion, and the planetary gear mechanism 60 and the clutches C1 and C2 are arranged on the two sides of the motor/generator 6. This construction may be modified such that the motor/generator 6 is arranged adjacent to the transmission 68 so that the clutches C1 and C2 are arranged closer to the engine 1 than the planetary gear mechanism 60.

The individual specific examples thus far described are so constructed that the reverse run can be made with the motive power of the engine 1 by changing the rotary elements to be coupled to the output shaft 67 by the clutches. However, the reverse run by the engine 1 can also be effected by changing how to input the motive power to the planetary gear mechanism, as will be exemplified in the following.

Figures 32, 33:
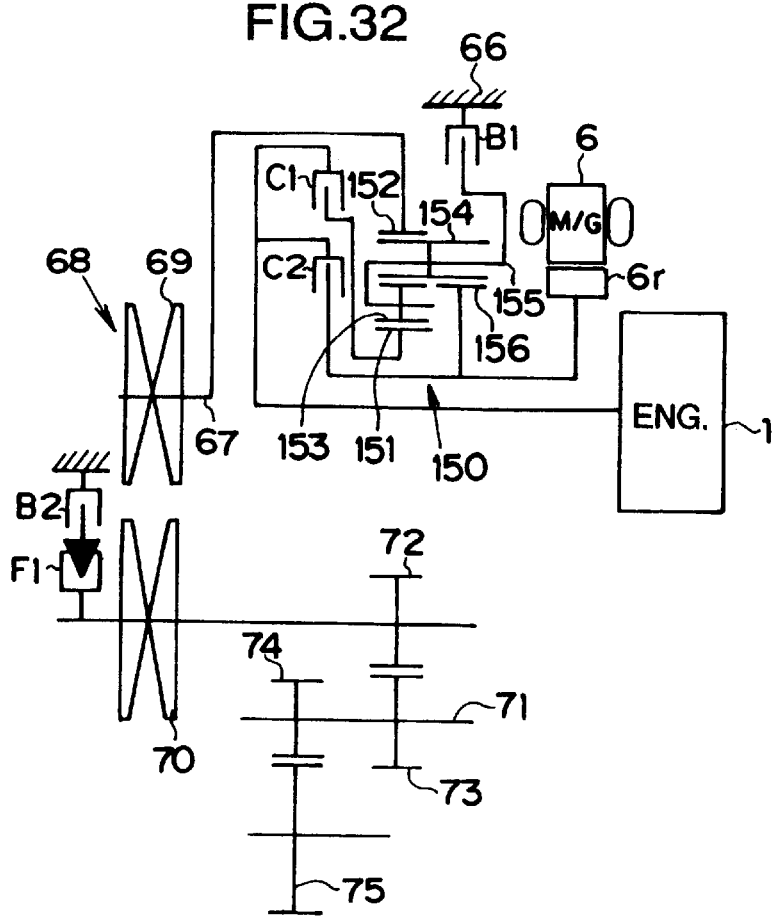
FIG. 32 is a skeleton diagram showing still another example of the invention.
FIG. 33 is a table enumerating the applied/released states of a frictional engagement device for setting individual drive modes in a hybrid drive system having the construction shown in FIG. 32.

FIG. 32 shows an example employing the Ravignaux type planetary gear mechanism 150. This Ravignaux type planetary gear mechanism 150 is the well-known one comprising: a first sun gear 151 which is an external gear; a ring gear 152 which is an internal gear arranged concentrically with the first sun gear 151; a carrier 155 retaining rotatably and revolvably a short pinion gear 153, as arranged between those sun gear 151 and ring gear 152 and meshing with the first sun gear 151, and a long pinion gear 154 meshing with the short pinion gear 153 and the ring gear 152; and a second sun gear 156 meshing with the long pinion gear 154. The motor/generator 6 is coupled to the second sun gear 156, and there are provided the first clutch C1 for coupling the engine 1 selectively to the first sun gear 151 and the second clutch C2 for coupling the engine 1 selectively to the second sun gear 156. Between the carrier 155 and the casing 66, there is interposed the brake B1, by which the carrier 155 is selectively fixed. Moreover, the output shaft 67 is coupled to the ring gear 152.

Between the driven pulley 70 and the casing 66, on the other hand, there are serially arrayed the one-way clutch F1 and a second brake B2. This one-way clutch F1 is applied when the member (e.g., the inner race) coupled to the driven pulley 70 rotates with the driven pulley 70 in the reverse running direction (or the opposite direction) with respect to the member (e.g., the outer race) on the side of the second brake B2. By applying the second brake B2, therefore, the driven pulley 70, the drive pulley 69 and the output shaft 67 are prevented from rotating in the reverse running direction. Since the remaining construction is similar to that shown in FIG. 7, its description will be omitted by giving the same reference numerals to FIG. 32 as those of FIG. 7.

In this hybrid drive system having the construction shown in FIG. 32, too, it is possible to effect the individual running modes (or drive modes) tabulated in FIG. 33, as will be described in the following.

Figure 34:
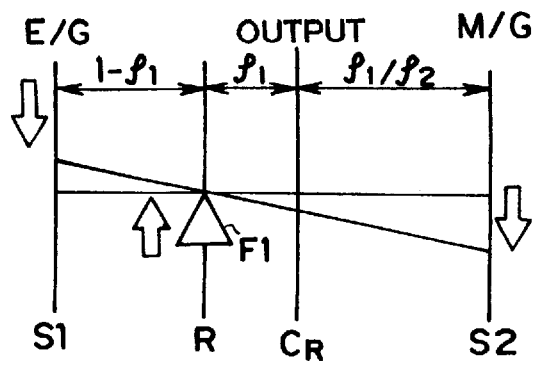
FIG. 34 is a nomographic chart for describing the rotational states of individual rotary elements in an engine start mode by the hybrid drive system having the construction shown in FIG. 32.

In the engine start mode, the first clutch C1 is applied to couple the engine 1 to the first sun gear 151, and the second brake B2 is applied to prevent the backward rotation of the output shaft 67, i.e., the ring gear 152. A nomographic chart of this state is illustrated in FIG. 34. In the following nomographic charts: ρ 1 designates the ratio in the tooth number between the first sun gear and the ring gear; ρ 2 the ratio in the tooth number between the second sun gear and the ring gear; S1 the first sun gear; and S2 the second sun gear. When the motor/generator 6 is rotated backward, the second sun gear 156 is rotated backward with the ring gear 152 being fixed, so that the first sun gear 151 rotates in the opposite direction to the second sun gear 156. In other words, the engine 1, as coupled to the first sun gear 151, is rotated forward by the motor/generator 6 so that the engine 1 can be started by filling it with the fuel or by igniting it, if necessary.

Figure 35:
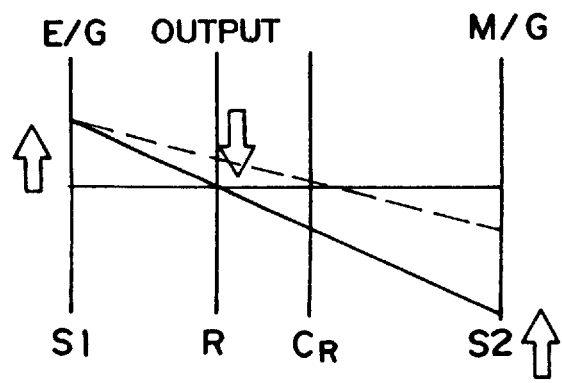
FIG. 35 is a nomographic chart for describing the rotational states of the individual rotary elements in an ETC mode by the hybrid drive system having the construction shown in FIG. 32.

At the time of the forward run, it is possible to establish the ETC mode in which the planetary gear mechanism 150 is caused to function like the torque converter. In this mode, only the first clutch C1 is applied to couple the engine 1 to the first sun gear 151. In this state, when the output shaft 67 and the ring gear 152 acting as the output element coupled to the former are fixed, the engine 1 and the motor/generator 6 are coupled to the first sun gear 151 and the second sun gear 156 or the rotary elements which rotate oppositely each other. A nomographic chart of this case is illustrated in FIG. 35. When the motor/generator 6 is activated backward to rotate the second sun gear 156 backward while the motive power of the engine 1 is being transmitted to the first sun gear 151 by activating the engine 1 in the most efficient state, the rotations of the ring gear 152 and the output shaft 67 integrated with the former are stopped according to the revolution speed of the motor/generator 6. This state is indicated by a solid line in FIG. 35.

As the output torque of the motor/generator 6 in the forward direction is raised from this state, the revolution speed (in the forward direction) of the second sun gear 156 is accordingly increased (that is, the revolution speed in the opposite direction is gradually lowered) so that the forward revolution speeds of the ring gear 152 and the output shaft 67 coupled to the former gradually rise. Since the revolution speed of the output torque is smaller than that of the engine 1, the output torque is amplified from the output torque of the engine 1 by the motor/generator 6. Thus, in the hybrid drive system having the construction shown in FIG. 32, too, the planetary gear mechanism 150 can function as the torque converter.

The motor mode for the forward run is set by applying the first brake B1 to fix the carrier 155. In this state, the second sun gear 156 and the ring gear 152 are in the relation to rotate oppositely each other, so that the ling gear 152 and the output shaft 67 coupled to the former rotate forward when the motor/generator 6 is rotted backward. In other words, the forward run can be effected by rotating the output shaft 67 with the motive power of the motor/generator 6. In this case, moreover, the driven pulley 70 rotates in the forward running direction so that the one-way clutch F1 is not applied, and the second brake B2 may be left applied.

In the engine/motor mode, the motive power of the engine 1 and the motive power of the motor/generator 6 are transmitted to the output shaft 67. In this state, therefore, the first clutch C1 and the second clutch C2 are applied. The first sun gear 151 and the second sun gear 156 or the two rotary elements are coupled through the clutches C1 and C2 so that the planetary gear mechanism 150 is integrated as a whole. As a result, the motive power of the engine 1 and the motive power of the motor/generator 6 are outputted as they are from the ring gear 152 to the output shaft 67.

Figure 36:
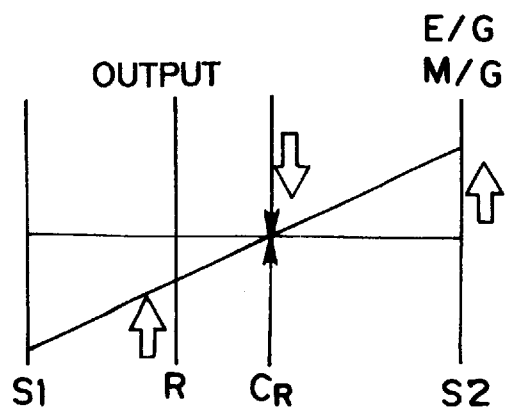
FIG. 36 is a nomographic chart for describing the rotational states of the individual rotary elements in an engine mode at a reverse running time by the hybrid drive system having the construction shown in FIG. 32.

For the reverse runs, there can be achieved three modes, of which the engine mode will be described first of all. In the case of the reverse run by the motive power of the engine 1, the second clutch C2 is applied to couple the engine 1 to the second sun gear 156, and the brake B1 is applied to fix the carrier 155. A nomographic chart of this state is illustrated in FIG. 36. The engine 1 and the output shaft 67 are coupled through the single pinion type planetary gear mechanism. With the carrier 155 being fixed, therefore, the second sun gear 156 is rotated by the engine 1 so that the ring gear 152 and the output shaft 67 coupled to the former rotate backward to effect the reverse run. In this case, as shown in FIG. 36, the ring gear 152 rotates backward so that the one-way clutch F1 coupled to the driven pulley 70 is applied. Since the second brake B2 in series with the one-way clutch F1 is released, however, the system is kept away from locking.

The motor mode for the reverse run is set by applying the first brake B1 exclusively. Specifically, the planetary gear mechanism 150 is caused to function as the single pinion type planetary gear mechanism by the second sun gear 156, the long pinion gear 154 meshing with the former, the carrier 155 and the ring gear 152. Since the carrier 155 is fixed by the brake B1, when the motor/generator 6 is rotated forward, the second sun gear 156 coupled thereto rotates forward so that the ring gear 152 rotates backward. As a result, the output shaft 67 is rotated backward by the motive power of the motor/generator 6 so that the reverse run can be effected. In this case, the driven pulley 70 rotates in the reverse running direction so that the one-way clutch F1 is applied. Since the second brake B2 is released, however, the system will not lock.

The engine mode for the reverse run is set by applying the second clutch C2 to couple the engine 1 to the second sun gear 156 and by applying the brake B1 to fix the carrier 155. In this state, not only the motive power of the motor/generator 6 of the aforementioned motor mode for the reverse run but also the motive power of the engine 1 is inputted to the second sun gear 156. As a result, the second sun gear 156 is rotated forward by the motive powers of the engine 1 and the motor/generator 6 so that the ring gear 152 is rotated backward by the corresponding torque. As a result, the output shaft 67 rotates backward to establish the reverse running state. In this case, too, the one-way clutch F1 is applied.

In the case of this reverse run, the motor/generator 6 and the engine 1 can be coupled. After the start of the reverse run by the motor/generator 6, therefore, the engine 1 is coupled to and started by the motor/generator 6. Before the start of the reverse run, alternatively, the engine 1 is started by the motor/generator 6 while the vehicle being stopped by slipping any of the frictional engagement devices. After this, the frictional engagement device is completely applied to start the reverse run.

In the hybrid drive system shown in FIG. 32, too, the planetary gear mechanism 150 can be made to function like the torque converter at the forward run to amplify the output torque, and the rotation of the output shaft 67 can be stopped to stop the vehicle while leaving the engine 1 active. By changing the inputting manner to the planetary gear mechanism 150 from the engine 1, moreover, the reverse run can be effected by the motive power of the engine 1. Even in case the state of charge of the (not-shown) battery drops, therefore, the reverse run can be effected with the necessary and sufficient driving force. In the hybrid drive system having the construction shown in FIG. 32, still moreover, the individual clutches C1 and C2 transmit the motive power of the engine 1 to the sun gears 151 and 156. Therefore, the transmission torque capacities, as demanded for the clutches C1 and C2, will not exceed the torque outputted by the engine 1 so that these clutches C1 and C2 can be given small capacities to reduce the entire size of the system.

Figures 37, 38:
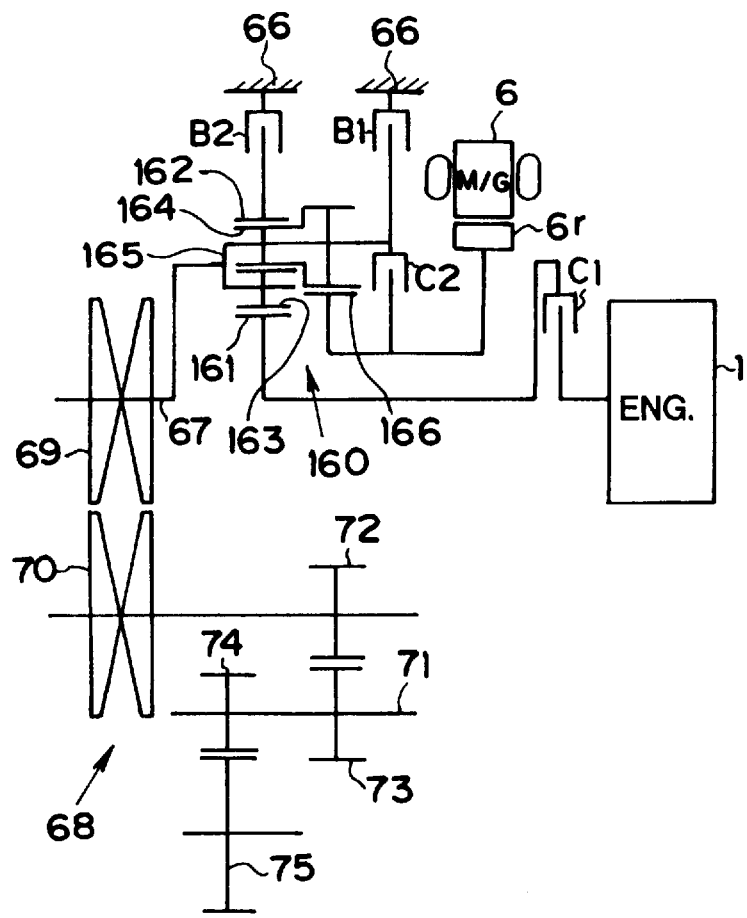
FIG. 37 is a skeleton diagram showing still another example of the invention.
FIG. 38 is a table enumerating the applied/released states of a frictional engagement device for setting individual drive modes in a hybrid drive system having the construction shown in FIG. 37.

Here will be described an example which employs a Ravignaux type planetary gear mechanism having a long pinion of different shape, as shown in FIG. 37. In the Ravignaux type planetary gear mechanism 160 as shown, the long pinion has a larger tooth number at a portion to mesh with the second sun gear. Specifically, this Ravignaux type planetary gear mechanism 160 comprises, as in the aforementioned one shown in FIG. 32: a first sun gear 161; a ring gear 162; a carrier 165 retaining a short pinion gear 163 meshing with the first sun gear 161 and a long pinion gear 164 meshing with the short pinion gear 163 and the ring gear 162 rotatably and revolvably; and a second sun gear 166 meshing with the long pinion gear 164. Moreover, this long pinion gear 164 is given a larger diameter at its portion meshing with the second sun gear 166 than that at its portion meshing with the ring gear 162 and is given a larger tooth number at its first-recited portion.

Moreover, the first clutch C1 is provided for coupling the engine 1 selectively to the first sun gear 161. The motor/generator 6 is coupled to the second sun gear 166, and the second clutch C2 is arranged between the second sun gear 166 and the carrier 165. Still moreover, the output shaft 67 is connected to the carrier 165, and there are provided the first brake B1 for fixing the carrier 165 selectively and the second brake B2 for fixing the ring gear 162 selectively. The remaining construction is similar to that shown in FIG. 7, and its description will be omitted by giving the same reference numerals to FIG. 37 as those of FIG. 7.

Figure 39:
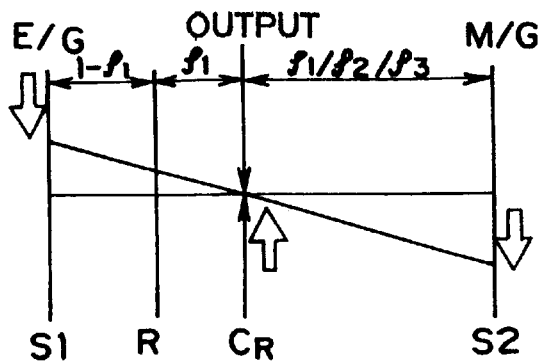
FIG. 39 is a nomographic chart for describing the rotational states of individual rotary elements in an engine start mode by the hybrid drive system having the construction shown in FIG. 37.

The running modes (or drive modes) to be set in this hybrid drive system shown in FIG. 37 are tabulated in FIG. 38. The engine start mode will be described first of all. When the engine 1 is to be started, the first clutch C1 is applied to couple the engine 1 to the first sun gear 161, and the first brake B1 is applied to fix the carrier 165. A nomographic chart in this state is illustrated in FIG. 39. Here in the following nomographic charts, $\rho$ 3 designates the ratio between the tooth number of that portion of the second pinion gear 164, which meshes with the first pinion gear 163, and the tooth number of that portion of the same, which meshes with the second sun gear 166. When the second sun gear 166 is rotated backward by the motor/generator 6 with the carrier 165 being fixed, the first sun gear 161 coupled to the engine 1 rotates forward. In other words, the engine 1 is rotated forward so that it can be started in this state by feeding it with the fuel or by igniting it, if necessary.

Figure 40:
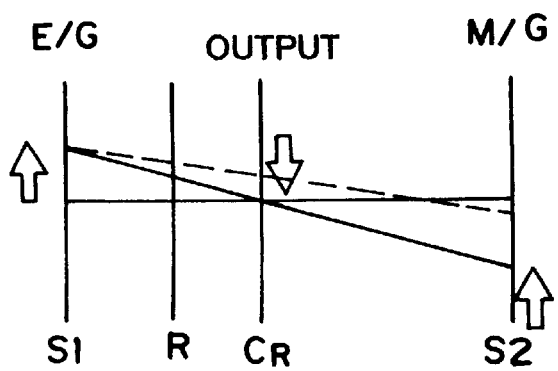
FIG. 40 is a nomographic chart for describing the rotational states of the individual rotary elements in an ETC mode by the hybrid drive system having the construction shown in FIG. 37.

At the time of the forward run, there can be established three drive modes as in the foregoing system shown in FIG. 32. First of all, here will be described the ETC mode in which the planetary gear mechanism 160 is made to function like the torque converter. In this case, only the first clutch C1 is applied. A nomographic chart in this state is illustrated in FIG. 40. Specifically, the engine 1 and the motor/generator 6 are coupled to the first sun gear 161 and the second sun gear 166 which take the relation to rotate oppositely each other when the carrier 165 integral with the output shaft 67 is fixed. In this state, therefore, the rotation of the output shaft 67 is stopped, as indicated by a solid line in FIG. 40, if the motor/generator 6 is rotated backward at a predetermined revolution speed, so that the stop state of the vehicle can be kept with the engine 1 being activated. If the revolution speed of the motor/generator 6 is changed from this state in the forward rotating direction, that is, if the motor/generator 6 is gradually rotated forward by reducing the revolution speed in the backward rotating direction, the output shaft 67 establishes a forward torque so that its revolution speed gradually rises. In this case, the torque of the output shaft 67 is amplified from the output torque of the engine 1. In other words, the driving torque is amplified by the motive power outputted from the motor/generator 6, while driving the engine 1. Thus, there is established the motor assist mode.

The motor mode for the forward run is set by applying the second clutch C2 to couple the motor/generator 6 directly to the output shaft 67 through the carrier 165. As a result, the motive power of the motor/generator 6 is transmitted as it is to the output shaft 67 so that the vehicle can be run by the motive power of the motor/generator 6.

The engine/motor mode for the forward run is set by applying the first clutch C1 and the second clutch C2. By applying the second clutch C2, specifically, the second sun gear 166 and the carrier 165 are coupled to integrate the planetary gear mechanism 160 as a whole. Since the first clutch C1 is applied to couple the engine 1 to the first sun gear 161 of the integrated planetary gear mechanism 160, moreover, the engine 1 and the motor/generator 6 are directly coupled to the output shaft 67. As a result, the motive powers of the engine 1 and the motor/generator 6 can be transmitted as they are to the output shaft 67 thereby to effect the forward run.

Figure 41:
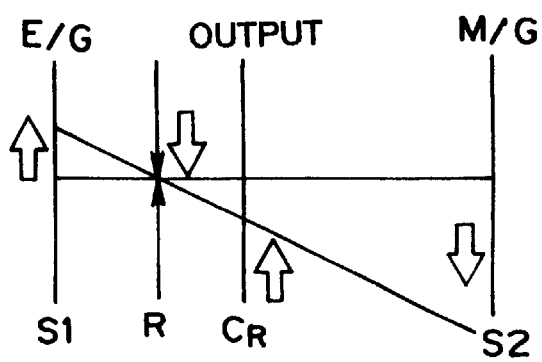
FIG. 41 is a nomographic chart for describing the rotational states of the individual rotary elements in an engine mode at a reverse running time by the hybrid drive system having the construction shown in FIG. 37.

For the reverse run, there can be established three drive running modes (or drive modes). The engine mode will be described first of all. When this reverse run is to be effected by the motive power of the engine 1, the first clutch C1 and the second clutch C2 are applied. Specifically, the engine 1 is coupled to the first sun gear 161, and the ring gear 162 is fixed. The nomographic chart of this state is illustrated in FIG. 41. When the first sun gear 161 is rotated forward by the engine 1 with the ring gear 162 being fixed, the carrier 165 and the output shaft 67 coupled to the former can rotate backward to effect the reverse run with the motive power of the engine 1.

The motor mode for the reverse run is set by applying the second brake B2 exclusively. In this mode, the motive power is inputted from the motor/generator 6 only to the second sun gear 166, and the ring gear 162 is fixed in this state, so that the carrier 165 and the output shaft 67 coupled to the former rotate backward. Since, in this case, the revolution speed of the carrier 165 is reduced according to the tooth number ratio (i.e., gear ratio) $\rho$ 2 between the second sun gear 166 and the ring gear 162 so that the output torque to be generated at the output shaft 67 is raised according to the gear ratio. As a result, the gear ratio at the reverse running time in the motor mode can be set at a large value.

The engine/motor mode for the reverse run with the engine 1 and the motor/generator 6 is set by applying the first clutch C1 and the second brake B2. Specifically, the engine 1 is coupled to the first sun gear 161, and the ring gear 162 is fixed. In this state, the torque in the backward rotating direction is applied to the carrier 165 by the motive power inputted to the first sun gear 161. Like this, the carrier 165 rotates backward when the motive power in the forward rotating direction is inputted to the second sun gear 166. As a result, the motive powers of the engine 1 and the motor/generator 6 can be synthesized by the planetary gear mechanism 160 and transmitted to the output shaft 67. In short, the output shaft 67 can be rotated backward for the reverse run by the motive powers of the engine 1 and the motor/generator 6.

In the aforementioned hybrid drive system shown in FIG. 37, too, the function as the so-called "torque converter" to amplify the output torque of the engine 1 and to output the amplified torque to the output shaft 67 can be achieved, and the reverse run can be effected by the engine 1. Even when the state of charge of the (not-shown) battery is lowered, therefore, the reverse run can be effected by the necessary and sufficient driving force.

In the hybrid drive system shown in FIG. 37, moreover, the individual clutches C1 and C2 are arranged to transmit the motive powers which are outputted from the engine 1 and the motor/generator 6 but not the torque which is amplified by the gear mechanism. As a result, the clutches C1 and C2 can have low torque transmission capacities so that the entire system can be made small and light.

Although the individual specific examples thus far described have employed one set of planetary gear mechanism, the system of the invention can employ a plurality of sets of planetary gear mechanisms, as will be exemplified in the following.

Figure 42:
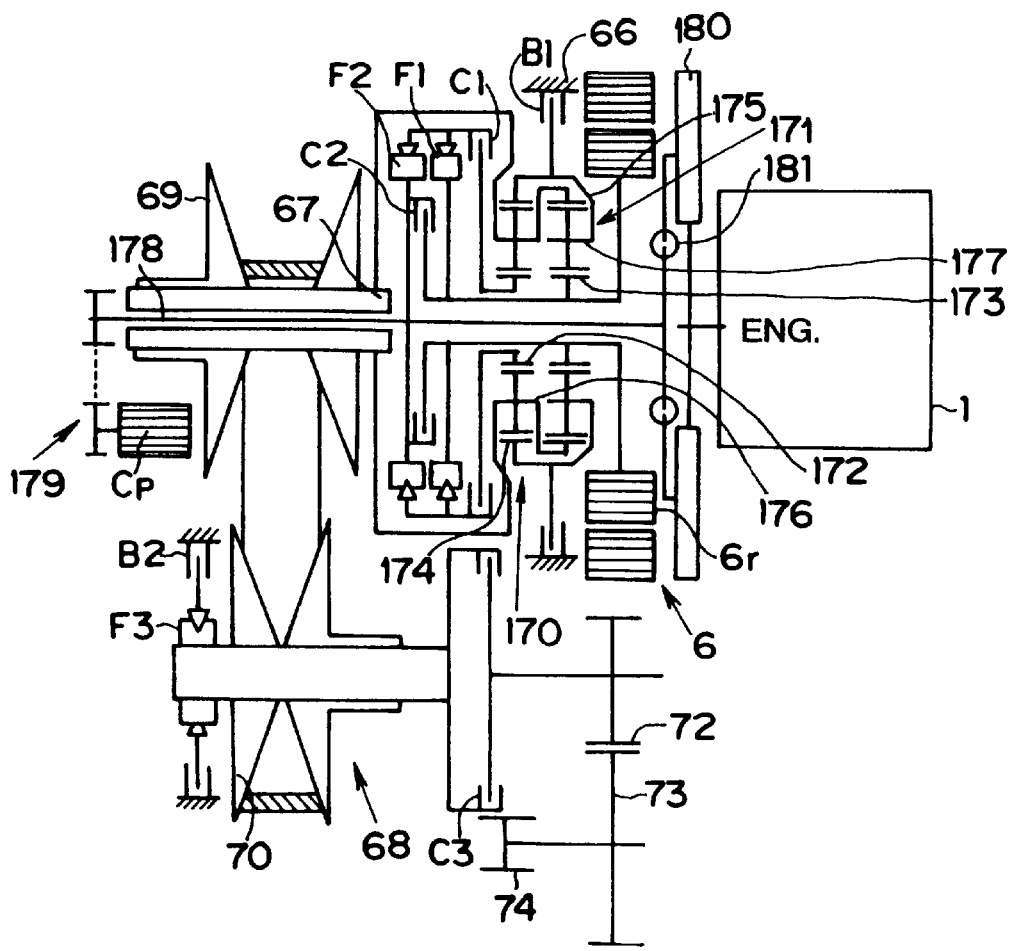
FIG. 42 is a skeleton diagram showing still another example of the invention.

The hybrid drive system shown in FIG. 42 employs two sets of single pinion type planetary gear mechanisms 170 and 171 having two rotary elements coupled to each other. These planetary gear mechanisms 170 and 171 respectively comprise rotary elements: sun gears 172 and 173; ring gears 174 and 175 arranged concentrically with the sun gears 172 and 173; and carriers 176 and 177 retaining pinion gears meshing with the sun gears 172 and 173 and the ring gears 174 and 175 rotatably and revolvably. Moreover, the carrier 176 of the first planetary gear mechanism 170 and the ring gear 175 of the second planetary gear mechanism 171 are integrally coupled, and the ring gear 174 of the first planetary gear mechanism 170 and the carrier 177 of the second planetary gear mechanism 171 are integrally coupled.

The motor/generator 6 is coupled to the sun gear 172 of the second planetary gear mechanism 171. Between the sun gear 173 and the sun gear 172 of the first planetary gear mechanism 170, there are serially arranged the first one-way clutch F1 and the multi-disc type first clutch C1 which are applied when the torque is transmitted in the forward rotating direction from the second planetary gear mechanism 171 to the first planetary gear mechanism 170. Between the engine 1 and the first clutch C1, moreover, there is arranged a second one-way clutch F2 which is applied when the torque is transmitted from the engine 1. As a result, the torque is transmitted from the engine 1 to the sun gear 172 of the first planetary gear mechanism 170 through the second one-way clutch F2 and the first clutch C1. Between the engine 1 and the sun gear 173 of the second planetary gear mechanism 171, moreover, there is arranged the multi-disc type second clutch C2.

There is provided the first brake B1 for selectively fixing the ring gear 174 of the first planetary gear mechanism 170 and the carrier 177 of the second planetary gear mechanism 171, which are coupled to each other. Moreover, the output shaft 67 is coupled to the carrier 176 of the first planetary gear mechanism 170.

Between the driven pulley 70 in the transmission 68 and the casing 66, on the other hand, there are arranged a third one-way clutch F3 and the multi-disc type second brake B2 in the recited order. This one-way clutch F3 is applied when the driven pulley 70 is to be rotated backward or receives the torque in the backward running direction. Between the driven pulley 70 and the counter gear 72, moreover, there is interposed the third clutch C3 for coupling the two selectively.

Through the drive pulley 69 and along its center axis, there is arranged a pump shaft 178. This pump shaft 178 is connected at its one end portion to the engine 1 or a shaft connected to the engine 1 so that it may rotate together, and the other end portion of the pump shaft 178 is connected through a chain mechanism 179 to the oil pump Op. Here, numeral 180 designates a drive plate, and numeral 181 designates a damper mechanism.

In the aforementioned hybrid drive system shown in FIG. 42, too, it is possible to set a variety of running modes (or drive modes) as in the foregoing individual examples. In the start mode for starting the engine 1 with the vehicle being stopped, specifically, the second clutch C2 is exclusively applied. When the second clutch C2 is applied, the engine 1 is coupled to the sun gear 173 of the second planetary gear mechanism 171. Since the motor/generator 6 is always coupled to the sun gear 173, moreover, the motor/generator 6 and the engine 1 are directly coupled. If the motor/generator 6 is driven in the forward rotating direction, therefore, the engine 1 is rotated so that it can be started by feeding it with the fuel in that state or by igniting it, if necessary.

On the other hand, the ETC mode, in which the output torque of the engine 1 can be amplified at the time of the forward run by the motor/generator 6 and outputted to the output shaft 67, is set by applying the first clutch C1 and the third clutch C3. When the carrier 176, as coupled to the output shaft 67, of the first planetary gear mechanism 170 and the ring gear 175 of the second planetary gear mechanism 171 are fixed, specifically, the sun gear 172 of the first planetary gear mechanism 170 and the sun gear 173 of the second planetary gear mechanism 171 take a relation to rotate oppositely each other so that the engine 1 and the motor/generator 6 are coupled to those oppositely rotating rotary elements.

Figure 43:
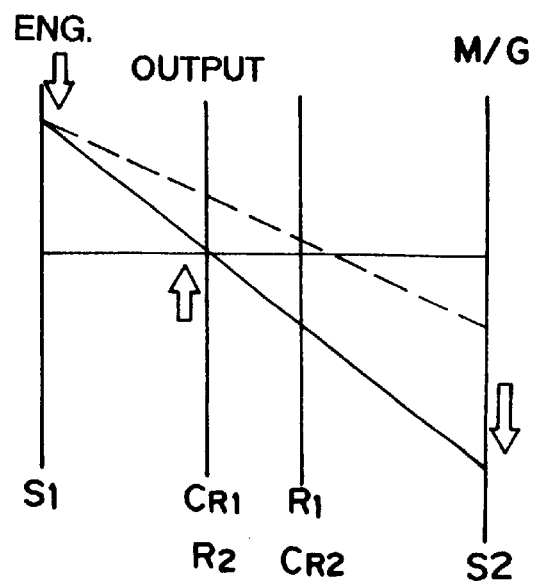
FIG. 43 is a nomographic chart for describing the rotational states of the individual rotary elements in an ETC mode by the hybrid drive system having the construction shown in FIG. 42.

This state is illustrated as a nomographic chart in FIG. 43. If the engine 1 is activated in the most efficient state to rotate the motor/generator 6 backward at a predetermined revolution speed, the rotation of the output shaft 67 can stop to keep the stop of the vehicle, as indicated by a sold line in FIG. 43. When the forward torque of the motor/generator 6 is raised from this state, the forward revolution speed of the motor/generator 6 rises (or the backward revolution speed lowers), so that the output elements, i.e., the carrier 176 of the first planetary gear mechanism 170 and the ling gear 175 of the second planetary gear mechanism 171, and the output shaft 67 coupled to them rotate forward, as indicated by a broken line in FIG. 43. Moreover, the torque to be generated at the output shaft 67 exceeds the output torque of the engine 1. As a result, the torque amplifying action is made as in the torque converter. Here, the transmission of the torque from the engine 1 to the first sun gear 172 is effected through the one-way clutch F2 so that this one-way clutch F2 is released in the power-OFF state. As a result, the engine 1 can be stopped in the power-OFF state.

In the motor mode for the forward run, the motor/generator 6 is "directly" coupled to the output shaft 67, and the first to third clutches C1, C2 and C3 are applied. The second one-way clutch F2 is applied because the forward torque is inputted to the second one-way clutch F2 from the engine 1 by applying the second clutch C2. Since the first clutch C1 in series with the second one-way clutch F2 is applied, moreover, the first one-way clutch F1 is coupled through the first clutch C1 to the sun gear 172 of the first planetary gear mechanism 170. As a result, the motor/generator 6 is coupled to the sun gear 172 of the first planetary gear mechanism 170. Since the motor/generator 6 is always coupled to the sun gear 173 of the second planetary gear mechanism 171, moreover, the individual sun gears 172 and 173 are integrally coupled. As a result, the first planetary gear mechanism 170 and the second planetary gear mechanism 171 are integrated as a whole so that the motive power of the motor/generator 6 can be transmitted as it is to the output shaft 67 to effect the forward run with the motive power of the motor/generator 6.

In this case, the second one-way clutch F2 and the first clutch C1 are applied so that the engine 1 is coupled to the sun gear 172 of the first planetary gear mechanism 170 and rotated by the motive power of the motor/generator 6. This causes the so-called "dragging" of the engine 1. Therefore, the resistance accompanying the idle run of the engine 1 is preferably lowered as much as possible either by opening the (not-shown) throttle valve of the engine 1 fully or by opening both the intake valve and the exhaust valve. Since the engine 1 is continuously rotated during the vehicle run, moreover, it can be easily started during the run.

With the first to third clutches C1, C2 and C3 being applied, as described above, the engine 1 and the motor/generator 6 are directly coupled to the output shaft 67. If not only the motor/generator 6 but also the engine 1 are activated, the vehicle can be run forward by the motive powers of the engine 1 and the motor/generator 6. Now, the engine/motor mode is established.

Figure 44:
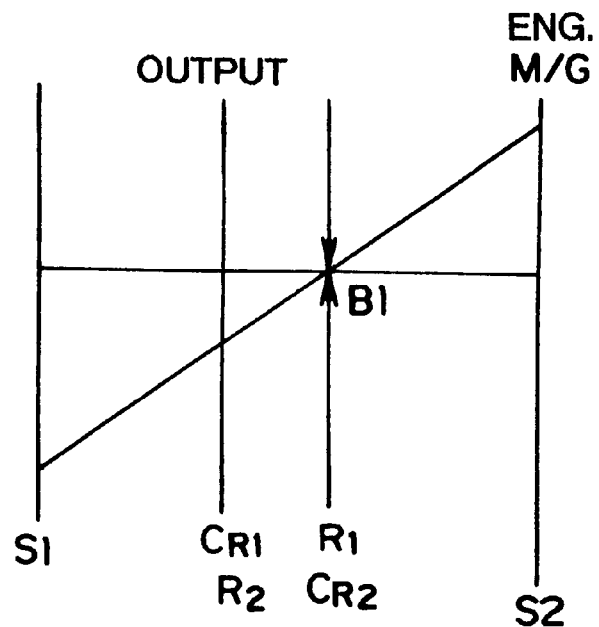
FIG. 44 is a nomographic chart for describing the rotational states of the individual rotary elements in an engine mode at a reverse running time by the hybrid drive system having the construction shown in FIG. 42.

Here will be described the modes for the reverse run. In the engine mode for the reverse run with the motive power of the engine 1, the second clutch C2, the third clutch C3 and the first brake B1 are applied. Specifically, the engine 1 is coupled to the sun gear 173 of the second planetary gear mechanism 171, and the carrier 177 of the second planetary gear mechanism 171 is fixed. If the sun gear 173 is rotated forward by the engine 1, therefore, the ring gear 175 and the output shaft 67 coupled to the former rotate backward so that the motive power of the engine 1 is outputted through the transmission 68 and the third clutch C3 to establish the reverse running state. This state is illustrated as a nomographic chart in FIG. 44.

In this case, moreover, the motor/generator 6 is always coupled to the sun gear 173 of the second planetary gear mechanism 172. If not only the engine 1 but also the motor/generator 6 are activated, therefore, the motive powers of the engine 1 and the motor/generator 6 are transmitted to the output shaft 67 thereby to establish the engine/motor mode for the reverse run.

If, moreover, the first brake B1 is applied to input the forward torque to the sun gear 173 of the second planetary gear mechanism 171, the ring gear 175 and the output shaft 67 coupled to the former rotate backward to establish the reverse running state. If the second clutch C2 is released to uncouple the engine 1 from the sun gear 173 of the second planetary gear mechanism 171 and if the motor/generator 6 is activated in the forward rotating direction, the vehicle is run backward by the motive power of the motor/generator 6. Here is established the motor mode for the reverse run.

Figure 45:
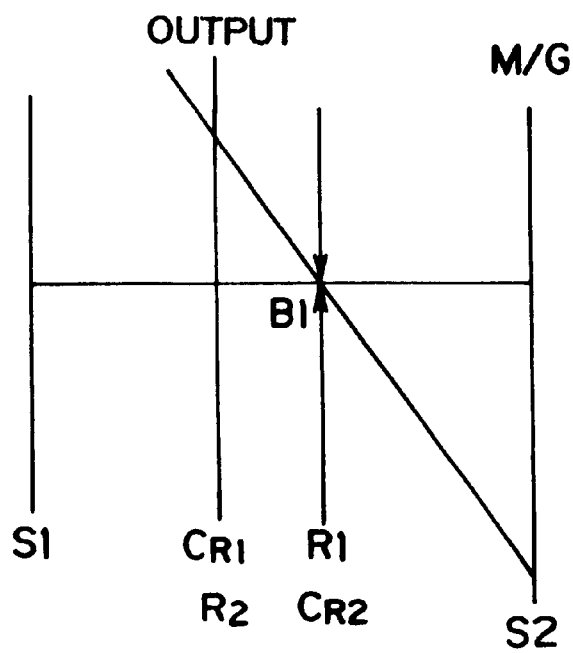
FIG. 45 is a nomographic chart for describing the rotational states of the individual rotary elements in an engine mode at a regenerative braking time by the hybrid drive system having the construction shown in FIG. 42.

If the sun gear 173 of the second planetary gear mechanism 171 is rotated forward with the carrier 177 of the second planetary gear mechanism 171 being fixed by the first brake B1, as described above, the ring gear 175 coupled to the output shaft 67 rotates backward. If the ring gear 175 is rotated forward, on the contrary, the sun gear 173 rotates backward. This action can be utilized to effect the regenerative braking at the forward running time. When the first brake B1 is applied in place of the first clutch C1 in response to a braking demand while the vehicle is running forward in the aforementioned ETC mode, for example, the ring gear 175 of the second planetary gear mechanism 171 is rotated forward by the torque inputted from the output shaft 67 with the carrier 177 of the same being fixed, as illustrated in the nomographic chart of FIG. 45, so that the sun gear 173 rotates backward. The torque acting on this sun gear 173 is transmitted to forcibly rotate the motor/generator 6 backward so that an electromotive force is generated in the motor/generator 6. In other words, the motive power to be inputted from the output shaft 67 is converted into and consumed the electric energy so that the resisting force at this time acts as the braking force.

The hybrid drive system thus far described with reference to FIG. 42 can also set a hill hold mode. This hill hold mode is one for holding the vehicle so that the vehicle may not go back at a starting time on an uphill, and is achieved by the aforementioned second brake B2 and the third one-way clutch in series with the former. Specifically, the third one-way clutch F3 is applied when the driven pulley 69 is to rotate in the reverse running direction. If, therefore, the vehicle is stopped with the second brake B2 and the third clutch C3 being applied and is released from the braking action, it is subjected to the load for a backward movement by its own weight. Specifically, the driven pulley 69 is prevented from rotating because it is subjected to the backward rotating torque so that the third one-way clutch F3 is applied. In short, the vehicle can be blocked against its backward movement to start smoothly on the uphill from its stopped state, even if the braking operation is released to operate the start.

In the hybrid drive system having the construction thus far described with reference to FIG. 42, too, a run required to generate a high driving force as at the start can be smoothed, and the reverse run can be made by the motive power of the engine 1 by amplifying the engine torque for the forward run and outputting the amplified torque. Even in the construction shown in FIG. 42, on the other hand, the first clutch C1 and the second clutch C2 transmit the output torque of the engine 1 as it is so that the construction need not have an especially large torque transmission capacity. As a result, those clutches C1 and C2 can be small-sized to make the hybrid drive system small and light as a whole.

Here will be described another example employing two sets of planetary gear mechanisms. The example shown in FIG. 46 employs two sets of single pinion type planetary gear mechanisms as in the foregoing example shown in FIG. 42, but is different from the construction of FIG. 42 in the coupling states of the rotary elements and in the coupling states of the engine 1 and the frictional engagement devices. Specifically, the carrier 176 of the first planetary gear mechanism 170 is integrally coupled to the ring gear 175 of the second planetary gear mechanism 171, and the sun gear 172 of the first planetary gear mechanism 170 is integrally coupled to the carrier 177 of the second planetary gear mechanism 171.

Moreover, the first clutch C1 is arranged between the ring gear 174 of the first planetary gear mechanism 170 and the engine 1, and the second clutch C2 is arranged between the sun gear 173 of the second planetary gear mechanism 171 and the engine 1. Moreover, the first brake B1 is arranged to fix the rotation of the sun gear 172 of the first planetary gear mechanism 170 selectively. The remaining construction is similar to that shown in FIG. 42, and its description will be omitted by giving the same reference numerals to FIG. 6 as those of FIG. 42.

Figure 47:
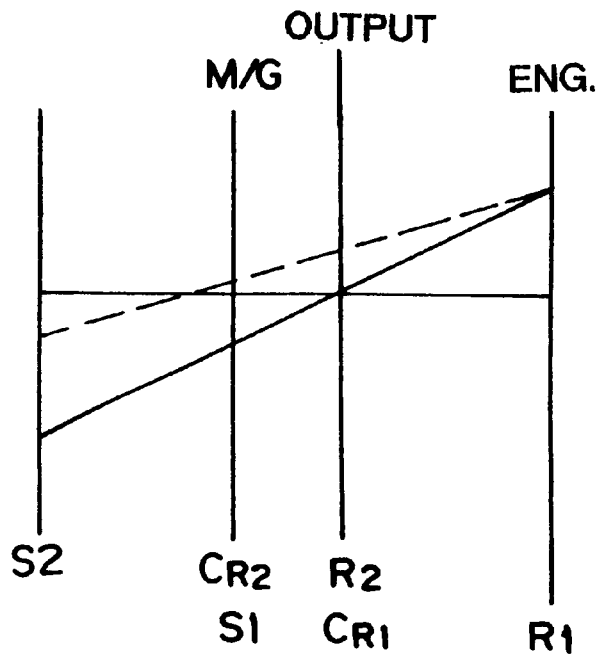
FIG. 47 is a nomographic chart for describing the rotational states of the individual rotary elements in an ETC mode by the hybrid drive system having the construction shown in FIG. 46.

The running modes (or drive modes) to be set by this hybrid drive system will be described in the following. The engine start mode is set by applying the first clutch C1 and the second brake B2. A nomographic chart of this state is illustrated in FIG. 47. When the second brake B2 is applied, the backward rotation of the driven pulley 70, i.e., the output shaft 67 is blocked by the third one-way clutch F3. When the motor/generator 6 is rotated backward to apply the backward torque to the sun gear 172 of the first planetary gear mechanism 170, therefore, the carrier 176 of the first planetary gear mechanism 170, as integrated with the output shaft 67, is fixed so that the ring gear 174 rotates forward. Since the engine 1 is coupled to this ring gear 174, it is rotated forward by the motive power of the motor/generator 6 so that it can be started in this state by feeding it with the fuel or by igniting it, if necessary.

In this case, the carrier 176 or the fixed element of the first planetary gear mechanism 170 can still rotate forward because it is kept away from the backward rotation by the third one-way clutch F3. Therefore, the engine 1 is activated, after started, in the most efficient state. As the output torque of the motor/generator 6 in the forward rotating direction is gradually raised in this state, the carrier 176 and the output shaft 67 integral with the former begin to rotate. In short, the third one-way clutch F3 is released from its applied state. Moreover, the driving torque in this case is amplified from the output torque of the engine 1 by the motor/generator 6. This operation is similar to the torque amplifying function by the torque converter. In the hybrid drive system having the construction shown in FIG. 46, therefore, the so-called "ETC mode" can be set by applying the first clutch C1 and the third clutch C3. In other words, this mode is set, when the rotary element integral with the output shaft 67 is fixed, by coupling the engine 1 and the motor/generator 6 to the two rotary elements having a relation to rotate in the opposite direction each other.

In this start of the vehicle, the second brake B2 and the third one-way clutch F3 are applied to prevent the backward movement of the vehicle, so that the aforementioned hill hold function can be achieved.

Here will be described the motor mode for the forward run. In this motor mode, the vehicle is run by the motive power of the motor/generator 6 by coupling the motor/generator 6 directly to the output shaft 67. For this mode, therefore, the first to third clutches C1, C2 and C3 are applied. When the first and second clutches C1 and C2 are applied, the ring gear 174 of the first planetary gear mechanism 170 and the sun gear 173 of the second planetary gear mechanism 171 are integrally coupled so that the individual planetary gear mechanisms 170 and 171 are integrated as a whole. As a result, the motor/generator 6 is directly coupled to the output shaft 67 so that its motive power is outputted as it is. In this case, the engine 1 is also directly coupled to the output shaft 67 through the planetary gear mechanisms 170 and 171 so that it rotates idly. In order to prevent the power loss due to the idle rotation of the engine 1, it is preferable to provide a suitable clutch mechanism for uncoupling the engine 1 from the integrated planetary gear mechanisms 170 and 171. If the engine 1 is made idle, moreover, it is easy to start the engine 1 and to run the accessories such as an air conditioner during the vehicle run.

In the motor mode, the engine 1 is also directly coupled to the output shaft 67, as described above. If not only the motor/generator 6 but also the engine 1 is activated, therefore, the vehicle can be run forward by the motive powers of the engine 1 and the motor/generator 6. Here is established the engine/motor mode.

Figure 46:
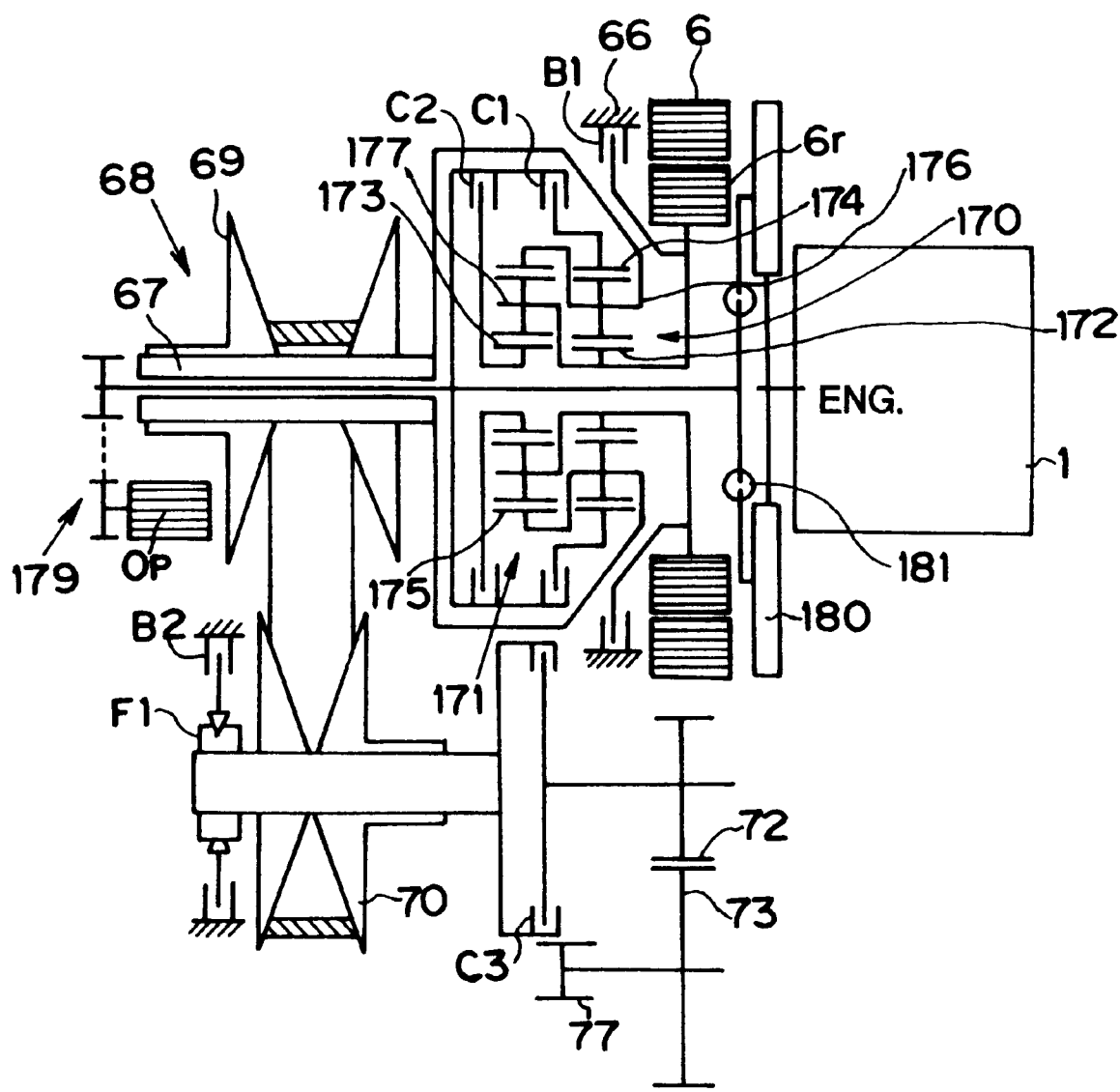
FIG. 46 is a skeleton diagram showing still another example of the invention.
Figure 48:
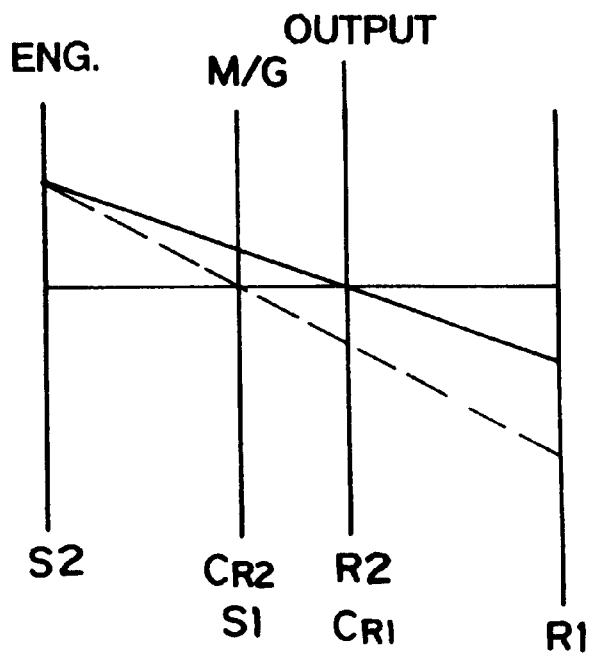
FIG. 48 is a nomographic chart for describing the rotational states of the individual rotary elements in an engine mode at a reverse running time by the hybrid drive system having the construction shown in FIG. 46.

With this construction shown in FIG. 46, too, a reverse run can be established by the output of the engine 1. This engine mode is set by applying the second clutch C2, the third clutch C3 and the first brake B1. This state is illustrated by a nomographic chart in FIG. 48. With the sun gear 172 of the first planetary gear mechanism 170 and the carrier 177 of the second planetary gear mechanism 171 being fixed by the first brake B1, the torque in the forward rotating direction is transmitted from the engine 1 through the second clutch C2 to the sun gear 173 of the second planetary gear mechanism 171. Then, the ring gear 175 and the output shaft 67 coupled to the former rotate backward so that the motive power of the engine 1 is outputted as the motive power in the backward rotating direction. In short, the vehicle is run backward.

In this mode, the reaction for the reverse run is established by the first brake B1. Since the motor/generator 6 is coupled to the sun gear 172 of the first planetary gear mechanism 170 to which the first brake B1 is coupled, however, the reaction can be established by the motor/generator 6. As the reaction by the motor/generator 6 is gradually lowered in this case, the sun gear 172 of the first planetary gear mechanism 170 and the carrier 177 of the second planetary gear mechanism 171, as integrated with the former gradually start to rotate forward. Simultaneously with this, the revolution speeds of the ring gear 175 and the output shaft 67 integral with the former lower, until the rotation of the output shaft 67 stops. If the reaction (or the torque in the backward rotating direction) by the motor/generator 6 is raised, on the contrary, the revolution speed of the output shaft 67 in the backward rotating direction rises. In short, the driving torque for the reverse run can be controlled by the output of the motor/generator 6 and can be amplified from the engine torque by the motor/generator 6. This operation is the torque amplifying function as in the ETC mode for the forward run so that the construction shown in FIG. 46 can also set the ETC mode at the time of the reverse run.

Here in the motor mode in which the motor/generator 6 is directly coupled to the output shaft 67, as described above, the engine 1 is also directly coupled to the output shaft 67. With the construction shown in FIG. 46, therefore, it is impossible to set the motor mode for the reverse run. When the suitable clutch means is provided for uncoupling the engine 1 from the integrated planetary gear mechanisms 170 and 171, however, the vehicle can be run backward exclusively by the motive power of the motor/generator 6.

Thus, even in the hybrid drive system having the construction shown in FIG. 46, too, there can be achieved the function as the torque converter for amplifying and outputting the engine torque, and the reverse run can be effected by the motive power of the engine 1. Even when the state of charge of the (not-shown) battery is low, therefore, it is possible to generate a driving force sufficient for the reverse run. Since the output torque of the engine 1 is unamplified and transmitted to the clutches C1 and C2 arranged adjacent to the planetary gear mechanisms 170 and 171, moreover, the torque transmission capacity, as required of those clutches C1 and C2, is so low that the system can be made small and light. Still moreover, the planetary gear mechanisms 170 and 171 can be arranged adjacent to the motor/generator 6, as shown in FIG. 46. With this construction, therefore, the planetary gear mechanisms 170 and 171 can be partially intruded into the inner circumference of the rotor of the motor/generator 6 so that the system can be axially shortened as a whole and made small and light.

According to the hybrid drive system of the invention, as has been described hereinbefore, the vehicle can be run backward by the motive power outputted from the internal combustion engine. Even when the state of charge of the battery or the prime mover of the electric motor goes down, the reverse run can be made by the large driving force of the internal combustion engine. At the forward run, on the other hand, the torque outputted from the internal combustion engine can be amplified with the motive power outputted from the electric motor and can be outputted to the output member so that a smooth run can be achieved even at the start time when a high torque is demanded. Still moreover, the revolution speed and the output torque of the output member can be controlled with the output of the electric motor while the internal combustion engine is run in a constant state, so that the control of the start time is facilitated. Since the internal combustion engine can be rotated and started by the electric motor, furthermore, the starter motor, as mounted on the ordinary vehicle in the prior art, can be eliminated to reduce the size and weight.

According to the invention, moreover, the torque outputted from the internal combustion engine can be amplified with the output of the electric motor even at the reverse run with the motive power of the internal combustion engine, so that the start control for the reverse run can be facilitated. Still moreover, the gear ratio of the reverse run can be enlarged to establish a driving force satisfying the demand.

INDUSTRIAL APPLICABILITY

The hybrid drive system of the invention is enabled to effect the reverse run with the internal combustion engine by mounting the electric motor and the internal combustion engine as the prime movers on the vehicle. This eliminates the restriction on the reverse run, as might otherwise be caused the state of charge of the battery for supplying the electric motive power of the electric motor. As a result, it is possible to improve the practicability of the hybrid vehicle employing the electric motor and the internal combustion engine as its prime movers and accordingly to promote the generalization of the same.

What is claimed:

1. A hybrid drive system which has: a torque amplify mechanism (12) coupled to an output member (2) of an internal combustion engine (1) and an output member (9) of an electric motor (6), as energized by an electric power to output a torque, for amplifying and outputting the torque, as outputted from said internal combustion engine (1), by controlling a torque of said electric motor (6); and a continuously variable transmission (21) arranged between torque amplify mechanism (12) and said output shaft (34) for increasing/decreasing and outputting a motive power inputted from said torque amplify mechanism (12), characterized by a forward/backward switching mechanism (29) interposed between said torque amplify mechanism (12) and said output shaft (34) for setting a forward state in which the inputted motive power is unreversed and outputted, and a backward state in which the inputted motive power is reversed and outputted.

2. A hybrid drive system as set forth in claim 1, characterized: in that said continuously variable transmission (21) includes a drive side member (22) and a driven side member (23) arranged to have center axes of rotation in parallel with each other; in that said electric motor (6), said internal combustion engine (1) and said torque amplify mechanism (12) are arranged in alignment with said drive side member (22); and in that said forward/backward switching mechanism (29) is arranged in alignment with said driven side member (23).

3. A hybrid drive system as set forth in claim 2, characterized: in that said forward/backward switching mechanism (29) includes a gear mechanism (30) for setting a forward state in which the directions of an input torque and an output torque are identical, and a backward state in which the directions of the input torque and the output torque are opposite, a first engagement device (35) for setting said gear mechanism (30) in the forward state, and a second engagement device (36) for setting said gear mechanism (30) in the backward state; and in that said engagement devices (35, 36) are arranged in alignment with said driven side member (23) and on the two sides across said driven side member (23).

4. A hybrid drive system as set forth in claim 1, characterized:
   in that said forward/backward switching mechanism (29) includes:
      a planetary gear mechanism (30) having rotary elements of a sun gear (31), a ring gear (32) arranged concentrically with said sun gear (31), and a carrier (33) retaining a pinion gear arranged between said sun gear (31) and said ring gear (32); and
      a first engagement device (35) for coupling any two of said rotary elements selectively; and
      a second engagement device (36) for fixing any of said rotary elements to rotate the other two rotary elements oppositely each other; and
   in that one of said any two of said rotary elements is coupled to said torque amplify mechanism (12) whereas the other rotary element is coupled to said output shaft (34).

5. A hybrid drive system for outputting a motive power from an internal combustion engine (1) and an electric motor (6, 84) to an output member (67, 106) through a planetary gear mechanism (60, 94, 140) including rotary elements of a sun gear (61, 95, 141), a ring gear (62, 98, 142) arranged concentrically with said sun gear (61, 95, 141), and a carrier (65, 96, 144) retaining rotatably and revolvably a plurality of pinion gears (63, 64, 143) arranged between said sun gear (61, 95, 141) and said ring gear (62, 98, 142), characterized by:
   brake means (B1, F1) for selectively fixing any one (62, 98, 144) of said three rotary elements that takes a relation, when fixed, in which the other two rotary elements rotate oppositely each other;
   first clutch means (C1, C3) for coupling either (61, 65, 95, 96, 141) of said two rotary elements (61, 95, 65, 141, 142) selectively to said output member (67, 106); and
   second clutch means (C2, C4) for coupling said output member (67, 106) selectively to the rotary element (62, 98, 144) which is fixed by said brake means (B1), and characterized:
      in that said internal combustion engine (1) is always or selectively coupled to the other (61, 65, 95, 96, 142) of said other two rotary elements (61, 95, 65, 96, 141, 142); and
      in that said electric motor (6, 84) is always or selectively coupled to the rotary element (61, 65, 95, 96, 141) which is coupled to said output member (67, 106) by said first clutch means (C1, C3).

6. A hybrid drive system as set forth in claim 5, characterized:

in that said planetary gear mechanism (60, 94) includes a double pinion type planetary gear mechanism having a first pinion gear (63) meshing with said sun gear (61, 95), and a second pinion gear (64) meshing with said first pinion gear (63) and said ring gear (62, 98);

in that said electric motor (6, 84) is coupled to said carrier (65, 96) retaining said pinion gears (63, 64);

in that said internal combustion engine (1) is coupled to said sun gear (61, 95);

in that said brake means (B1, F1) is arranged between said ring gear (62, 98) and a casing (66, 79); and in that said output member (67, 106) is coupled through said first clutch means (C1, C3) to said carrier (65, 96) and further through said second clutch means (C2, C4) to said ring gear (62, 98).

7. A hybrid drive system as set forth in claim 5, characterized:

in that said planetary gear mechanism (60) includes a double pinion type planetary gear mechanism having a first pinion gear (63) meshing with said sun gear (61), and a second pinion gear (64) meshing with said first pinion gear (63) and said ring gear (62);

in that said internal combustion engine (1) is coupled to said carrier (65) retaining said pinion gears (63, 64);

in that said electric motor (6) is coupled to said sun gear (61);

in that said brake means (B1, F1) is arranged between said ring gear (62) and said casing (66); and in that said output member (67) is coupled through said first clutch means (C1) to said sun gear (61) and further through said second clutch means (C2) to said ring gear (62).

8. A hybrid drive system as set forth in claim 5, characterized:

in that said planetary gear mechanism (140) includes a single pinion type planetary gear mechanism having a plurality of pinion gears (143) meshing with said sun gear (141) and said ring gear (142);

in that said brake means (B1, F1) is arranged between said carrier (144) retaining said pinion gears (143) and a casing (66);

in that said electric motor (6) is coupled to said sun gear (141);

in that said internal combustion engine (1) is coupled to said ring gear (142); and in that said output member (67) is coupled through said first clutch means (C1) to said sun gear (141) and further through said second clutch means (C2) to said carrier (144).

9. A hybrid drive system for outputting a motive power from an internal combustion engine (1) and an electric motor (6) to an output member (67) through a planetary gear mechanism (60) including rotary elements of a sun gear (61), a ring gear (62) arranged concentrically with said sun gear (61), and a carrier (65) retaining rotatably and revolvably a plurality of pinion gears (63, 64) arranged between said sun gear (61) and said ring gear (62), characterized by:

first input clutch means (C1) for coupling said electric motor (6) selectively to any one (62) of said three rotary elements that takes a relation, when fixed, in which the other two rotary elements (61, 65) rotate oppositely each other;

second input clutch means (C2) for coupling said electric motor (6) selectively to either (65) of said other two rotary element (61, 65);

first output clutch means (C3) for coupling said rotary element (65), to which said electric motor (6) is coupled by said second input clutch means (C2), selectively to said output member (67); and second output clutch means (C4) for coupling the rotary element (62), which is coupled to said electric motor (6) by said first input clutch means (C1), selectively to said output member (67), and characterized in that said internal combustion engine (1) is coupled always or selectively to the other (61) of said two rotary element (61, 65).

10. A hybrid drive system as set forth in claim 9, further characterized by a one-way clutch (F1) arranged between said rotary element (62), which is coupled to said first input clutch means (C1) and said second output clutch means (C4), and a casing (66).

11. A hybrid drive system for transmitting a motive power outputted from an internal combustion engine (1) and a motive power outputted from an electric motor (6), either individually or synthetically to an output member (67), characterized by:

a Ravignaux type planetary gear mechanism (150) including a first sun gear (151), a ring gear (152) arranged concentrically with said first sun gear (151), a carrier (155) retaining rotatably and revolvably a first pinion gear (153) meshing with said first sun gear (151) and a second pinion gear (154) meshing with said first pinion gear (153) and said ring gear (152), and a second sun gear (156) meshing with said second pinion gear (154);

first clutch means (C1) for coupling said internal combustion engine (1) selectively to said first sun gear (151);

second clutch means (C2) for coupling said internal combustion engine (1) selectively to said second sun gear (156); and brake means (B1) for fixing said carrier (155) selectively, and characterized: in that said electric motor (6) is coupled to said second sun gear (156); and in that said output member (67) is coupled to said ring gear (152).

12. A hybrid chive system as set forth in claim 11, further characterized by fixing means (B2, F1) for selectively stopping the rotation of either said output member (67) or a member (70) which is integrally connected to said output member (67).

13. A hybrid drive system for transmitting a motive power outputted from an internal combustion engine (1) and a motive power outputted from an electric motor (6), either individually or synthetically to an output member (67), characterized by:

a Ravignaux type planetary gear mechanism (160) including a first sun gear (161), a ring gear (162) arranged concentrically with said first sun gear (161), a carrier (165) retaining rotatably and revolvably a first pinion gear (163) meshing with said first sun gear (161) and a second pinion gear (164) meshing with said first pinion gear (163) and said ring gear (162), and a second sun gear (166) meshing with said second pinion gear (164);

first clutch means (C1) for coupling said internal combustion engine (1) selectively to said first sun gear (161);

second clutch means (C2) for coupling said electric motor (6) selectively to said carrier (165); and brake means (B2) for fixing said ring gear (162) selectively, and characterized: in that said electric motor (6) is coupled to said second sun gear (166); and in that said output member (67) is coupled to said carrier (165).

14. A hybrid drive system as set forth in claim 13, further characterized by fixing means (B1) for selectively stopping the rotation of either said output member (67) or a member (165) which is integrally connected to said output member (67).

15. A hybrid drive system as set forth in claim 13, further characterized in that the tooth number of that portion of said second pinion gear (164) which meshes with said first pinion gear (163), and the tooth number of that portion of the same which meshes with said second sun gear (166), are different.

16. A hybrid drive system for transmitting a motive power outputted from an internal combustion engine (1) and a motive power outputted from an electric motor (6), either individually or synthetically to an output member (67), characterized by:

a first planetary gear mechanism (170) and a second planetary gear mechanism (171) including rotary elements of a sun gear (172, 173), a ring gear (174, 175) arranged concentrically with said sun gear (172, 173), a carrier (176, 177) retaining rotatably and revolvably a pinion gear arranged between said sun gear (172, 173) and said ring gear (174, 175);

brake means (B1) for selectively fixing any one (177) of the rotary elements in said second planetary gear mechanism (171), that take a relation, when fixed, in which the other two rotary elements rotate oppositely each other; and second clutch means (C2) for coupling said internal combustion engine (1) selectively to either (173) of said other two rotary elements (173, 175), and characterized:

in that the other rotary element (175) is coupled to said output member (67);

in that any one (176) of the rotary elements of said first planetary gear mechanism (170) that takes a relation, when fixed, in which the other two rotary elements rotate oppositely each other, is coupled to said output member (67);

in that said internal combustion engine (1) is selectively coupled to either (172) of said other two rotary elements (172, 174) in said first planetary gear mechanism (170); and in that the motive power of said electric motor (6) is transmitted to the other (174) of said other two rotary elements (172, 174) in said first planetary gear mechanism (170).

17. A hybrid drive system as set forth in claim 16, further characterized:

in that said first planetary gear mechanism (170) and said second planetary gear mechanism (171) include a single pinion type planetary gear mechanism in which a plurality of pinion gears meshing with said sun gears (172, 173) and said ring gears (174, 175) are retained rotatably and revolvably by said carriers (176, 177);

in that said brake means (B1) is arranged between the carrier (177) of said second planetary gear mechanism (171) and a casing (66), in that said carrier (177) is coupled to the ring gear (174) of said first planetary gear mechanism (170);

in that said second clutch means (C2) is arranged to couple the sun gear (173) of said second planetary gear mechanism (171) and said internal combustion engine (1), and in that said electric motor (6) is coupled to said sun gear (173);

in that the ring gear (175) of said second planetary gear mechanism (171) is coupled to the carrier (176) of said first planetary gear mechanism (170);

in that the carrier (176) of said first planetary gear mechanism (170) is coupled to the ring gear (175) of said second planetary gear mechanism (171) and an output member (67); and in that the sun gear (172) of said first planetary gear mechanism (170) is coupled through first clutch means (C1) to said internal combustion engine (1).

18. A hybrid drive system as set forth in claim 16, further characterized:

in that said first planetary gear mechanism (170) and said second planetary gear mechanism (171) include a single pinion type planetary gear mechanism in which a plurality of pinion gears meshing with said sun gears (172, 173) and said ring gears (174, 175) are retained rotatably and revolvably by said carriers (176,177);

in that the carrier (177) of said second planetary gear mechanism (171) is coupled to the sun gear (172) of said first planetary gear mechanism (170), in that said brake means (B1) is arranged to fix said carrier (177) and said sun gear (172) selectively;

in that said second clutch means (C2) is arranged to couple the sun gear (173) of said second planetary gear mechanism (171) and said internal combustion engine (1);

in that the ring gear (175) of said second planetary gear mechanism (171) is coupled to the carrier (176) of said first planetary gear mechanism (170), and in that said carrier (176) is coupled to said output member (67); and in that the ring gear (174) of said first planetary gear mechanism (170) is coupled through first clutch means (C1) to said internal combustion engine (1).

19. A hybrid drive system as set forth in claim 16, further characterized by fixing means (B2, F1, F3) for selectively stopping the rotation of either said output member (67) or a member (70) which is integrally connected to said output member (67).

* * * * *